US009779515B2

(12) United States Patent
El-Ghoroury et al.

(10) Patent No.: US 9,779,515 B2
(45) Date of Patent: Oct. 3, 2017

(54) SPATIO-TEMPORAL LIGHT FIELD CAMERAS

(71) Applicant: Ostendo Technologies, Inc., Carlsbad, CA (US)

(72) Inventors: Hussein S. El-Ghoroury, Carlsbad, CA (US); Zahir Y. Alpaslan, San Marcos, CA (US); Jingbo Cai, Carlsbad, CA (US); Marty Maiers, Fallbrook, CA (US); Philip Warner, San Marcos, CA (US); Dale A. McNeill, Carlsbad, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 0 days.

(21) Appl. No.: 15/585,033

(22) Filed: May 2, 2017

(65) Prior Publication Data

US 2017/0236295 A1 Aug. 17, 2017

Related U.S. Application Data

(60) Continuation of application No. 14/872,901, filed on Oct. 1, 2015, which is a division of application No.
(Continued)

(51) Int. Cl.
*H04N 5/225* (2006.01)
*H04N 5/232* (2006.01)
(Continued)

(52) U.S. Cl.
CPC ............ *G06T 7/557* (2017.01); *G02B 3/0056* (2013.01); *G02B 13/0085* (2013.01); *H04N 5/04* (2013.01);
(Continued)

(58) Field of Classification Search
CPC .... H04N 5/225; H04N 5/2254; H04N 5/2258; H04N 5/23248; H04N 13/282; G06T 2207/10052; G06T 2200/21; G06T 7/557
See application file for complete search history.

(56) References Cited

U.S. PATENT DOCUMENTS 5,059,008 A 10/1991 Flood et al.
5,691,836 A 11/1997 Clark
(Continued)

FOREIGN PATENT DOCUMENTS

CN 102007771 4/2011
EP 1956410 8/2008
(Continued)

OTHER PUBLICATIONS

"International Search Report and Written Opinion of the International Searching Authority Dated Mar. 19, 2013, International Application No. PCT/US2012/068029", (Mar. 19, 2013).
(Continued)

*Primary Examiner* — Abdelaaziz Tissire
(74) *Attorney, Agent, or Firm* — Blakely Sokoloff Taylor & Zafman LLP

(57) ABSTRACT

Spatio-temporal light field cameras that can be used to capture the light field within its spatio temporally extended angular extent. Such cameras can be used to record 3D images, 2D images that can be computationally focused, or wide angle panoramic 2D images with relatively high spatial and directional resolutions. The light field cameras can be also be used as 2D/3D switchable cameras with extended angular extent. The spatio-temporal aspects of the novel light field cameras allow them to capture and digitally record the intensity and color from multiple directional views within a wide angle. The inherent volumetric compactness of the light field cameras make it possible to embed in small mobile devices to capture either 3D images or computation-
(Continued)

ally focusable 2D images. The inherent versatility of these light field cameras makes them suitable for multiple perspective light field capture for 3D movies and video recording applications.

16 Claims, 13 Drawing Sheets

Related U.S. Application Data

13/659,776, filed on Oct. 24, 2012, now Pat. No. 9,179,126.

(60) Provisional application No. 61/654,688, filed on Jun. 1, 2012.

(51) Int. Cl.
| | | |
|---|---|---|
| *G06T 7/557* | (2017.01) | |
| *H04N 9/097* | (2006.01) | |
| *H04N 5/04* | (2006.01) | |
| *G02B 13/00* | (2006.01) | |
| *G02B 3/00* | (2006.01) | |

(52) U.S. Cl.
CPC ....... *H04N 5/2258* (2013.01); *H04N 5/23232* (2013.01); *H04N 9/097* (2013.01); *G06T 2207/10024* (2013.01); *G06T 2207/10028* (2013.01); *G06T 2207/10052* (2013.01); *H04N 5/23212* (2013.01)

(56) References Cited

U.S. PATENT DOCUMENTS

| | | |
|---|---|---|
| 5,986,811 A | 11/1999 | Wohlstadter |
| 6,137,535 A | 10/2000 | Meyers |
| 6,151,167 A | 11/2000 | Melville |
| 6,433,907 B1 | 8/2002 | Lippert et al. |
| 6,795,221 B1 | 9/2004 | Urey |
| 6,795,241 B1 | 9/2004 | Holzbach |
| 6,803,561 B2 | 10/2004 | Dunfield |
| 6,924,476 B2 | 8/2005 | Wine et al. |
| 6,937,221 B2 | 8/2005 | Lippert et al. |
| 6,999,238 B2 | 2/2006 | Glebov et al. |
| 7,009,652 B1 | 3/2006 | Tanida et al. |
| 7,061,450 B2 | 6/2006 | Bright et al. |
| 7,071,594 B1 | 7/2006 | Yan et al. |
| 7,106,519 B2 | 9/2006 | Aizenberg et al. |
| 7,190,329 B2 | 3/2007 | Lewis et al. |
| 7,193,758 B2 | 3/2007 | Wiklof et al. |
| 7,209,271 B2 | 4/2007 | Lewis et al. |
| 7,215,475 B2 | 5/2007 | Woodgate et al. |
| 7,232,071 B2 | 6/2007 | Lewis et al. |
| 7,286,143 B2 | 10/2007 | Kang et al. |
| 7,292,257 B2 | 11/2007 | Kang et al. |
| 7,324,687 B2 | 1/2008 | Zitnick, III et al. |
| 7,369,321 B1 | 5/2008 | Ren et al. |
| 7,379,583 B2 | 5/2008 | Zitnick, III et al. |
| 7,400,439 B2 | 7/2008 | Holman |
| 7,482,730 B2 | 1/2009 | Davis et al. |
| 7,486,255 B2 | 2/2009 | Brown et al. |
| 7,561,620 B2 | 7/2009 | Winder et al. |
| 7,580,007 B2 | 8/2009 | Brown et al. |
| 7,609,906 B2 | 10/2009 | Matusik et al. |
| 7,619,807 B2 | 11/2009 | Baek et al. |
| 7,620,309 B2 | 11/2009 | Georgiev |
| 7,623,560 B2 | 11/2009 | El-Ghoroury et al. |
| 7,630,118 B2 | 12/2009 | Onvlee |
| 7,639,293 B2 | 12/2009 | Narabu |
| 7,656,428 B2 | 2/2010 | Trutna, Jr. |
| 7,671,893 B2 | 3/2010 | Li et al. |
| 7,702,016 B2 | 4/2010 | Winder et al. |
| 7,703,924 B2 | 4/2010 | Nayar |
| 7,724,210 B2 | 5/2010 | Sprague et al. |
| 7,732,744 B2 | 6/2010 | Utagawa |
| 7,767,479 B2 | 8/2010 | El-Ghoroury et al. |
| 7,780,364 B2 | 8/2010 | Raskar et al. |
| 7,791,810 B2 | 9/2010 | Powell |
| 7,792,423 B2 | 9/2010 | Raskar et al. |
| 7,829,902 B2 | 11/2010 | El-Ghoroury et al. |
| 7,832,947 B2 | 11/2010 | Takahashi |
| 7,841,726 B2 | 11/2010 | Conner |
| 7,872,796 B2 | 1/2011 | Georgiev |
| 7,880,794 B2 | 2/2011 | Yamagata et al. |
| 7,897,910 B2 | 3/2011 | Roichman et al. |
| 7,916,934 B2 | 3/2011 | Vetro et al. |
| 7,936,392 B2 | 5/2011 | Ng et al. |
| 7,949,252 B1 | 5/2011 | Georgiev |
| 7,952,809 B2 | 5/2011 | Takai |
| 7,956,924 B2 | 6/2011 | Georgiev |
| 7,962,033 B2 | 6/2011 | Georgiev |
| 7,965,936 B2 | 6/2011 | Raskar et al. |
| 8,009,358 B2 | 8/2011 | Zalevsky et al. |
| 8,019,215 B2 | 9/2011 | Georgiev et al. |
| 8,049,231 B2 | 11/2011 | El-Ghoroury et al. |
| 8,106,994 B2 | 1/2012 | Ichimura |
| 8,126,323 B2 | 2/2012 | Georgiev et al. |
| 8,243,770 B2 | 8/2012 | El-Ghoroury et al. |
| 8,567,960 B2 | 10/2013 | El-Ghoroury et al. |
| 8,749,620 B1 | 6/2014 | Knight et al. |
| 8,928,969 B2 | 1/2015 | Alpaslan et al. |
| 2004/0119869 A1 | 6/2004 | Tretter et al. |
| 2006/0056076 A1* | 3/2006 | Araki .................. G02B 7/023 359/811 |
| 2006/0056084 A1 | 3/2006 | Araki |
| 2006/0061660 A1 | 3/2006 | Brackmann |
| 2006/0072029 A1 | 4/2006 | Miyatake et al. |
| 2006/0098285 A1 | 5/2006 | Woodgate et al. |
| 2006/0221209 A1* | 10/2006 | McGuire .......... H01L 27/14625 348/239 |
| 2007/0002159 A1 | 1/2007 | Olsen et al. |
| 2007/0045518 A1 | 3/2007 | Mishina et al. |
| 2007/0046898 A1 | 3/2007 | Conner |
| 2007/0052808 A1 | 3/2007 | Schroderus |
| 2007/0109412 A1 | 5/2007 | Hara |
| 2007/0109813 A1 | 5/2007 | Copeland et al. |
| 2007/0263298 A1 | 11/2007 | El-Ghoroury et al. |
| 2007/0279535 A1 | 12/2007 | Fiolka |
| 2008/0117491 A1 | 5/2008 | Robinson |
| 2008/0165270 A1 | 7/2008 | Watanabe et al. |
| 2008/0309813 A1 | 12/2008 | Watanabe |
| 2009/0015918 A1 | 1/2009 | Morozumi et al. |
| 2009/0086170 A1 | 4/2009 | El-Ghoroury et al. |
| 2009/0140131 A1 | 6/2009 | Utagawa |
| 2009/0185801 A1 | 7/2009 | Georgiev et al. |
| 2009/0190022 A1 | 7/2009 | Ichimura |
| 2009/0213236 A1 | 8/2009 | Chiou et al. |
| 2009/0219954 A1 | 9/2009 | Gollier |
| 2009/0244302 A1 | 10/2009 | Tsai |
| 2009/0278998 A1 | 11/2009 | El-Ghoroury et al. |
| 2010/0003777 A1 | 1/2010 | El-Ghoroury et al. |
| 2010/0026852 A1* | 2/2010 | Ng ..................... G02B 3/0056 348/239 |
| 2010/0026960 A1 | 2/2010 | Sprague |
| 2010/0066921 A1 | 3/2010 | El-Ghoroury et al. |
| 2010/0085468 A1 | 4/2010 | Park et al. |
| 2010/0091050 A1 | 4/2010 | El-Ghoroury et al. |
| 2010/0165155 A1 | 7/2010 | Chang |
| 2010/0220042 A1 | 9/2010 | El-Ghoroury et al. |
| 2010/0245957 A1 | 9/2010 | Hudman et al. |
| 2010/0265369 A1 | 10/2010 | Chang |
| 2010/0265386 A1 | 10/2010 | Raskar et al. |
| 2011/0074926 A1 | 3/2011 | Khan et al. |
| 2011/0096156 A1 | 4/2011 | Kim et al. |
| 2011/0128393 A1* | 6/2011 | Tavi .................. H04N 5/2257 348/218.1 |
| 2011/0129165 A1 | 6/2011 | Lim et al. |
| 2011/0150441 A1 | 6/2011 | Ollila et al. |
| 2011/0157367 A1 | 6/2011 | Chang |
| 2011/0157387 A1 | 6/2011 | Han et al. |
| 2011/0181706 A1 | 7/2011 | Harrold et al. |
| 2011/0234841 A1* | 9/2011 | Akeley .................. H04N 5/232 348/222.1 |

(56) References Cited

U.S. PATENT DOCUMENTS

| | | | |
|---|---|---|---|
| 2011/0249146 A1* | 10/2011 | Ishida | H04N 5/23238 348/231.99 |
| 2012/0033113 A1 | 2/2012 | El-Ghoroury et al. | |
| 2012/0127334 A1 | 5/2012 | Imai | |
| 2012/0200810 A1 | 8/2012 | Horikawa | |
| 2012/0249550 A1 | 10/2012 | Akeley et al. | |
| 2012/0300097 A1 | 11/2012 | Ng et al. | |
| 2013/0141895 A1 | 6/2013 | Alpaslan et al. | |
| 2013/0148950 A1 | 6/2013 | Chang | |
| 2013/0258451 A1 | 10/2013 | El-Ghoroury et al. | |
| 2013/0321581 A1 | 12/2013 | El-Ghoroury et al. | |
| 2014/0267849 A1 | 9/2014 | Geelen et al. | |
| 2015/0278988 A1 | 10/2015 | MacMillan et al. | |

FOREIGN PATENT DOCUMENTS

| | | |
|---|---|---|
| EP | 2190019 | 5/2010 |
| EP | 2398235 | 12/2011 |
| JP | 9-54281 | 2/1997 |
| JP | 9-109455 | 4/1997 |
| JP | 2003-283932 | 10/2003 |
| JP | 2004-146619 | 5/2004 |
| JP | 2005-012619 | 1/2005 |
| JP | 2006-033493 | 2/2006 |
| JP | 2007-025601 | 2/2007 |
| JP | 2008-304572 | 12/2008 |
| JP | 2008-545550 | 12/2008 |
| JP | 2009-506384 | 2/2009 |
| JP | 2010-068435 | 3/2010 |
| JP | 2010-510643 | 4/2010 |
| JP | 2010-117398 | 5/2010 |
| JP | 2011-100090 | 5/2011 |
| JP | 2012-049999 | 3/2012 |
| TW | 201031193 | 8/2010 |
| TW | 201126205 | 8/2011 |
| WO | WO-2005/048599 | 5/2005 |
| WO | WO-2006/125224 | 11/2006 |
| WO | WO-2007/092545 | 8/2007 |
| WO | WO-2008/064361 | 5/2008 |
| WO | WO-2011/065738 | 6/2011 |

OTHER PUBLICATIONS

"International Search Report and Written Opinion of the International Searching Authority Dated Sep. 18, 2013; International Application No. PCT/US2012/068028", (Sep. 18, 2013).

"Invitation to Pay Additional Fees, Partial Search Report Dated Jan. 25, 2013, International Application No. PCT/US2012/068028", (Jan. 25, 2013).

"Notice of Allowance Dated Feb. 27, 2017; European Patent Application No. 12805502.7", (Feb. 27, 2017).

"Notice of Allowance Dated Feb. 7, 2017; U.S. Appl. No. 14/872,862", (Feb. 7, 2017).

"Notice of Allowance Dated Mar. 10, 2017; U.S. Appl. No. 14/872,901", (Mar. 10, 2017).

"Office Action Dated Apr. 5, 2017; U.S. Appl. No. 14/872,929", (Apr. 5, 2017).

"Office Action Dated Aug. 2, 2016; U.S. Appl. No. 14/872,929", (Aug. 2, 2016).

"Office Action Dated Aug. 23, 2016; Japanese Patent Application No. 2014-546036", (Aug. 23, 2016).

"Office Action Dated Aug. 9, 2016; Taiwanese Patent Application No. 101145956", (Aug. 9, 2016).

"Office Action Dated Dec. 20, 2016; Japanese Patent Application No. 2015-514977", (Dec. 20, 2016).

"Office Action Dated Dec. 20, 2016; U.S. Appl. No. 14/872,901", (Dec. 20, 2016).

"Office Action Dated Jan. 10, 2017; U.S. Appl. No. 14/872,834", (Jan. 10, 2017).

"Office Action Dated Jan. 28, 2016; U.S. Appl. No. 14/872,929", (Jan. 28, 2016).

"Office Action Dated Jun. 14, 2016; U.S. Appl. No. 14/872,834", (Jun. 14, 2016).

"Office Action Dated Jun. 16, 2016; U.S. Appl. No. 14/872,901", (Jun. 16, 2016).

"Office Action Dated Mar. 3, 2017; Taiwanese Patent Application No. 101145956", (Mar. 3, 2017).

"Office Action Dated Sep. 30, 2015; European Patent Application No. 12805502.7", (Sep. 30, 2015).

Adelson, Edward H., et al., "Single Lens Stereo with a Plenoptic Camera", *IEEE Transactions on Pattern Analysis and Machine Intelligence*, vol. 14, No. 2, (Feb. 1992), pp. 99-106.

Bolles, Robert C., et al., "Epipolar-Plane Image Analysis: An Approach to Determining Structure from Motion", *International Journal of Computer Vision*, vol. 1, (1987), pp. 7-55.

Georgiev, Todor, et al., "Light Field Camera Design for Integral View Photography", *Adobe Technical Report*, (2003), pp. 1-13.

Nayar, Shree K., "Computational Cameras: Approaches, Benefits and Limits", *Columbia University Technical Report No. CUCS-001-11*, (Jan. 15, 2011), pp. 1-22.

Ng, Ren, "Digital Light Field Photography", *Stanford University Doctorial Thesis*, (Jul. 2006), 203 pp. total.

Ng, Ren, et al., "Light Field Photography with a Hand-held Plenoptic Camera", *Stanford University Tech Report CTSR 2005-02*, (2005), pp. 1-11.

Veeraraghavan, Ashok, et al., "Dappled Photography: Mask Enhanced Cameras for Heterodyned Light Fields and Coded Aperture Refocusing", *Mitsubishi Electric Research Laboratories (MERL) TR2007-115*; ACM Transactions on Graphics, vol. 26, No. 3, Article 69, (Jul. 2007), pp. 69-1-69-12, 14 pp. total.

U.S. Appl. No. 14/872,834, filed Oct. 1, 2015.

U.S. Appl. No. 14/872,962, filed Oct. 1, 2015.

U.S. Appl. No. 14/872,929, filed Oct. 1, 2015.

"Notice of Allowance dated Jun. 13, 2017; Japanese Patent Application No. 2015-514977", (Jun. 13, 2017).

"Notice of Allowance dated May 5, 2017; U.S. Appl. No. 14/872,834", (May 5, 2017).

* cited by examiner

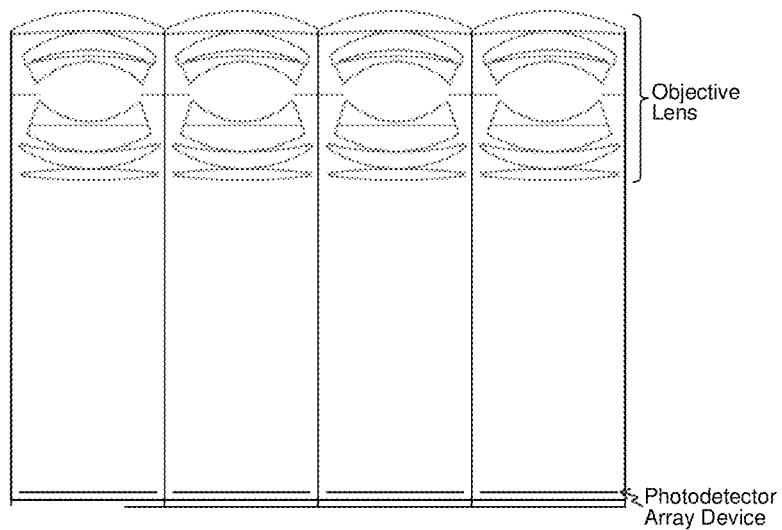
Fig. 1A: Prior Art - Light Field Camera Array
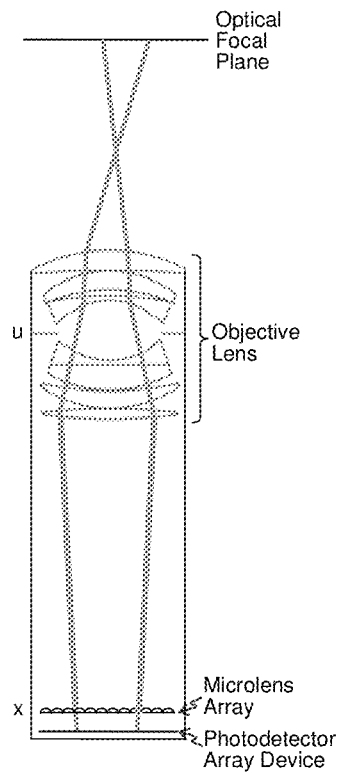
Fig. 1B: Prior Art - Light Field Plenoptic Camera

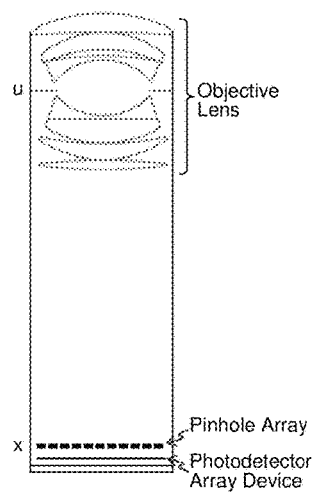
Fig. 1C: Prior Art - Light field Radiance Capture Camera
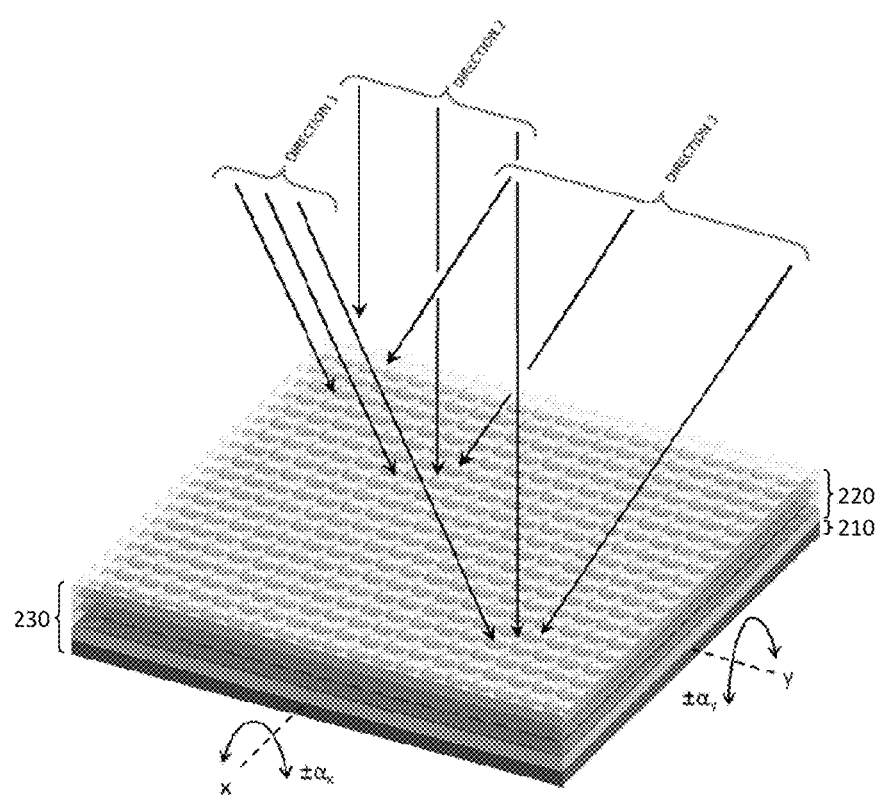
Fig. 2

600
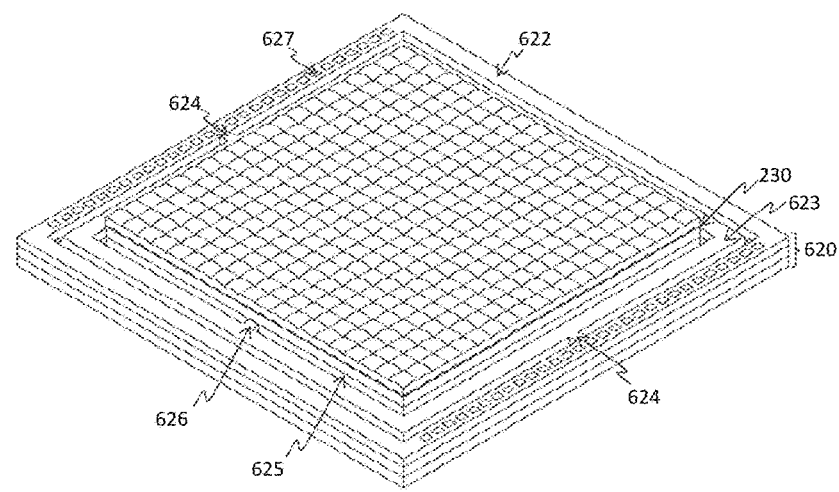
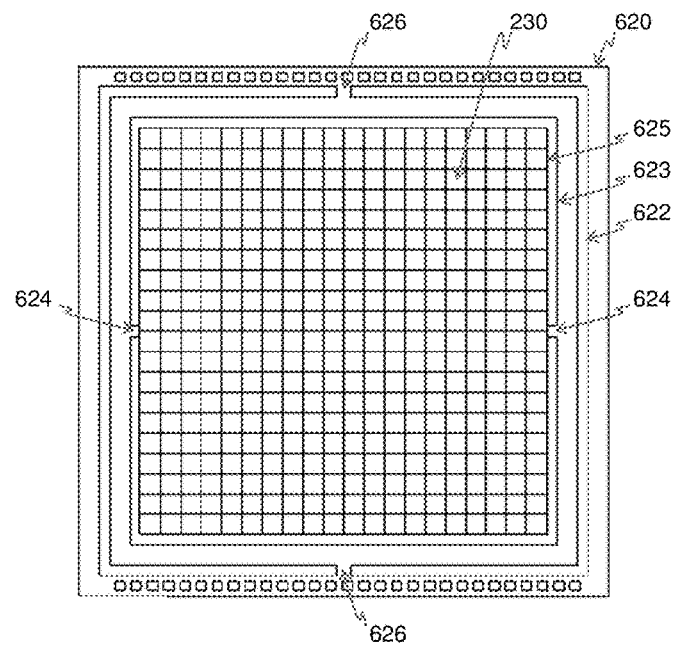
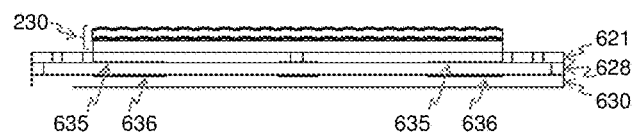
Fig. 6

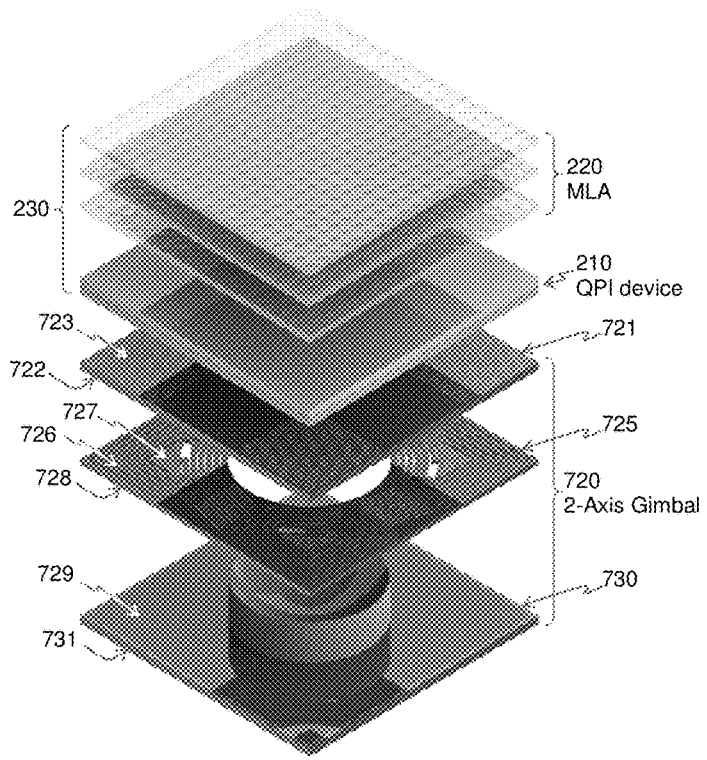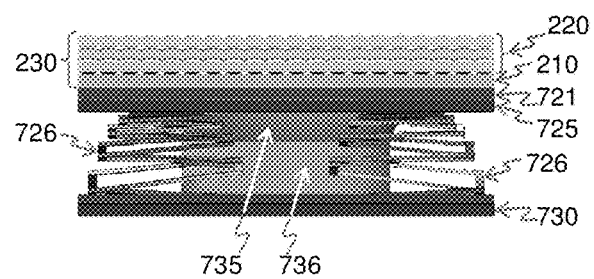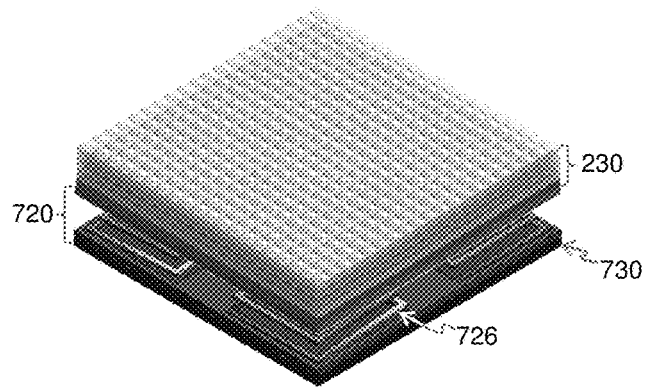
Fig. 7

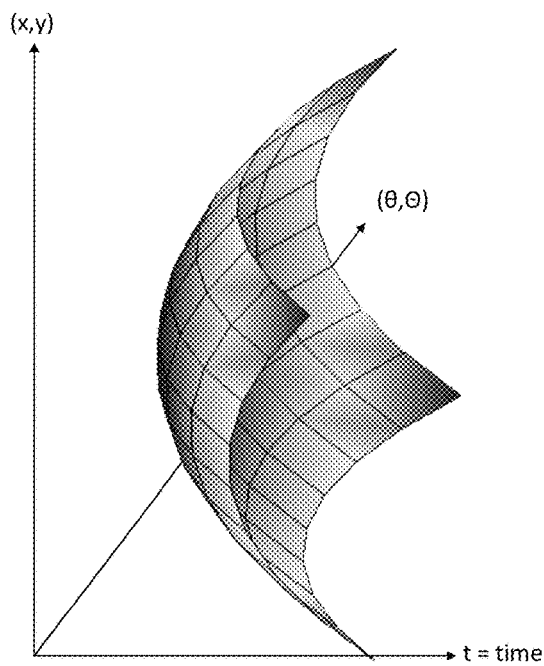
Fig. 9C: Curved Temporal Parallax
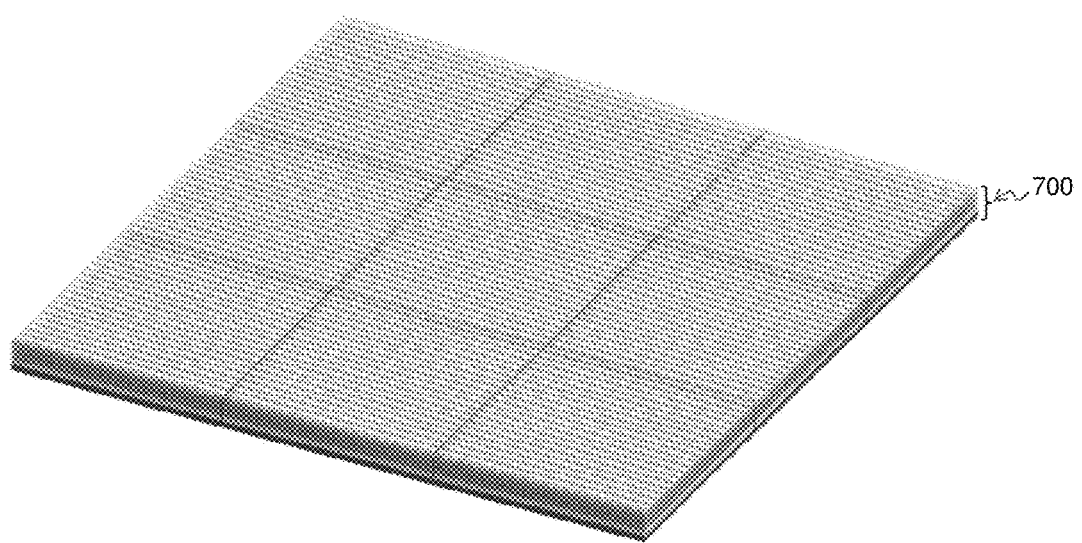
Fig. 10

SPATIO-TEMPORAL LIGHT FIELD CAMERAS

CROSS-REFERENCE TO RELATED APPLICATIONS

This application is a continuation of U.S. patent application Ser. No. 14/872,901 filed Oct. 1, 2015, which is a divisional of U.S. patent application Ser. No. 13/659,776 filed Oct. 24, 2012 which claims the benefit of U.S. Provisional Patent Application No. 61/654,688 filed Jun. 1, 2012.

BACKGROUND OF THE INVENTION

1. Field of the Invention

The present invention relates to the field of light field cameras, radiance cameras, directional light capture, 3D cameras and 2D/3D switchable cameras.

2. Prior Art

The advent of nano-scale semiconductors is making it possible to have sufficient computing resources within a typical mobile device, such as a cell phone or a tablet PC, for example, to process high resolution visual information received and/or transmitted through the high data rate mobile networks such devices can typically connect to. A typical mobile device now has a 1M pixel display and an 8M pixel camera allowing the mobile user to view and capture high resolution visual information. With such visual communication capabilities, mobile devices are on the verge of being capable of processing 3D visual information. Although the capture and recording of 2D visual information by ultra compact cameras that meet the stringent volumetric constraints of the mobile devices is now main stream, such is not the case for the capture and recording of 3D visual information. Even in the case of the capture and recording of 2D visual information, the stringent volumetric constraints of the mobile devices is still making it difficult to have cameras with advanced auto focusing capabilities embedded in such devices. The main reason being the bulkiness, poor performance and excessive added cost of incorporating advanced auto focusing features into cameras targeting the mobile devices. A promising prospect for possibly overcoming some of these constraints is a class of cameras known as light field cameras which are capable of capturing information about the directional distribution of the light rays that enter the camera. Besides providing the mobile user with the ability to capture 3D images, the ability to capture the directional information of the light would also enable computational (digital) focusing which would allow the mobile user to capture the entire light field without regard to focusing, then leverage the ample processing capabilities of the mobile device to computationally focus on any desired aspects of the captured light field. In that regard a light field mobile camera would in effect leverage the abundant processing resources now becoming typical in mobile devices to get rid of the expensive and bulky auto focusing. The problem in realizing such a prospect, however, is that the current state-of-the-art light field cameras are inherently bulky in themselves and not at all suited for being embedded in mobile devices. Before proceeding to describe the details of the current invention, the following discussion puts into perspective the current state-of-the-art of light field cameras approaches and their salient characteristics.

Conventional cameras do not record the directional information of the light it captures. A conventional camera captures only a two-dimensional (2D) image that represents a one to one correspondence in light originating from a point in the viewing scene to a corresponding spatial position (pixel) on its photo-detector (PD), as such spatial information is captured but all of the directional information is lost. In contrast to conventional 2D cameras, light field cameras capture both the spatial as well as the directional information of the light. Light field cameras are able to capture both spatial and directional information of the light because they are able to record the radiance of the light, which describes both spatial and directional (angular) information, and is defined as the radiant flux of the incident light per unit of area per unit of solid angle (measured in $W \cdot m^{-2} \cdot Sr^{-1}$). A light field camera, therefore, is able to sample the four-dimensional (4D) radiance, in so doing captures both the two dimensions of spatial and the two dimensions of directional distributions of the light it captures. Being able to record the radiance, a light field camera therefore captures all of the light field information needed to post-capture focusing, reduce the noise, or change the viewpoint; i.e., three-dimensional (3D) image capture.

FIG. 1A illustrates a prior art light field camera implemented using an array of conventional cameras whereby each of the cameras records an image of the light field from a different perspective. The captured images may then be combined to form the captured light field. The drawbacks of this approach are rather obvious; in order to capture a reasonable angular extent with each camera in the array, the array of objective lenses will span a much larger area than their photo-detectors and will each have a rather large optical track length, thus making the whole camera array of FIG. 1A be limited in terms of the number of views of the light field it can capture, and excessively bulky, thus not at all suitable for embedding in mobile devices.

FIG. 1B illustrates another prior art light field camera implemented using the principal of integral imaging. In this light field camera approach, which is also known as a plenoptic camera, only one objective lens is used and a lenslet or micro lens array is placed near the camera photo-detector to sample the aperture of the camera. The image captured by the plenoptic camera would be made up of an array of sub-aperture images of the light field each recorded by the group of pixels underneath each of the micro lens elements. Each of the sub-aperture images captured by the plenoptic camera would represent a parallax sample of the light field. Although the plenoptic camera of FIG. 1B would potentially provide a higher number of views of the light field and would also be volumetrically smaller than the camera array of FIG. 1A, the increase in the number of views would be at the expense of reduced spatial resolution. In addition, similar to the camera array, for the plenoptic camera to cover a reasonable angular extent, it must employ an as large as possible diameter objective lens which in turn requires a large optical track length, thus make the plenoptic camera also bulky and not at all suitable for embedding in mobile devices.

FIG. 1C illustrates yet another prior art light field camera implemented by using the principal of frequency domain analysis of the light field. In this type of prior art field camera, which although is conceptually equivalent to the plenoptic camera of FIG. 1B, for differentiation will be referred to as radiance camera, is implemented by placing a non-refractive two-dimensional array of pinholes, basically a mask, either in front of the objective lens or in between the main lens assembly and the photo-detector of an otherwise conventional camera. The image captured by such a camera is, therefore, a Fourier domain convolution of the incoming light field with the known non-refractive light field modulation weighting function of the mask. This camera actually captures the 4-D light field directly in the Fourier domain, thus the values recorded by each pixel of the 2-D photo-detector of the camera represents a coded linear combination in the Fourier domain of all the rays entering the camera from multiple directions. The known linear combination superimposed by the non-refractive mask light field can be decoded by software to obtain the 4-D light field. In general the performance of this radiance camera is similar in terms the spatial and directional resolution it can achieve using a given photo-detector size, in terms of number of pixels, except that the radiance analysis camera may offer increased spatial resolution per view, but the number of views that can be resolved is highly dependent on the computational throughput one is willing to allocate to the post-capture processing. In other words, the improvement in the spatial resolution per view that may be offered by the radiance camera would be at the expense of increased computational resources. Furthermore, the mask used in the radiance camera will cause light loss that would tend to reduce the capture image signal to noise ratio (SNR). In addition, similar to the camera array and the plenoptic camera, for the radiance camera to cover a reasonable angular extent, it must employ as large as possible diameter objective lens which in turn requires a large optical track length, thus making the radiance analysis camera also bulky and not at suitable for embedding in mobile devices.

In general, prior art light field cameras illustrated in FIGS. 1A, 1B and 1C are limited in their functionality and applications because:

1. The depth of their light field is limited by the focus depth of their objective lens;

2. The field of view of their light field is limited by the angular extent of their objective lens;

3. Their objective lens and MLA (micro lens arrays) must have a matched F#, which results in complicated and costly lens system designs;

4. The large diameter of the objective lens needed to achieve a reasonable size field of view typically results in a rather large optical track length which in turn causes the volumetric size of the light field camera to become large, thus reducing the utility of the camera and preventing its use in mobile applications;

5. The objective lens system adds well known optical distortions and aberrations, such as barrel distortion, TV distortion, etc. . . . , which reduce the optical quality of the captured light field and in turn distort the depth and directional information captured by such cameras; and 6. The light field captured by such cameras usually suffers from under-sampling and resultant sampling artifacts because the limited resolution of the sensor, which typically has to be apportioned between the achievable spatial and angular resolution, limits the total number of directions these light field cameras can capture.

It is therefore an objective of this invention to introduce a spatio-temporal light field camera that overcomes the limitations and weaknesses of the prior art, thus making it feasible to create a light field camera that can be embedded in mobile devices and offer the users of such devices the capability of computational focusing of 2D images and the capture of 3D images over a wide angular extent. Additional objectives and advantages of this invention will become apparent from the following detailed description of a preferred embodiment thereof that proceeds with reference to the accompanying drawings.

BRIEF DESCRIPTION OF THE DRAWINGS

The invention is illustrated by way of example, and not by way of limitation, in the Figures of the accompanying drawings in which like reference numerals refer to similar elements.

FIG. 1A illustrates a prior art light field camera array.

FIG. 1B illustrates a prior art plenoptic camera.

FIG. 1C illustrates a prior art prior radiance capture camera.

FIG. 2 illustrates an isometric view of the principle aspects of the spatio-temporal light field camera of this invention.

FIG. 6 illustrates isometric, top and side views of one embodiment of the spatio-temporal light field camera of this invention.

FIG. 7 illustrates an exploded isometric, side and top views of another embodiment of the spatio-temporal light field camera of this invention.

FIG. 9C illustrates the curved temporal parallax that can be captured by the spatio-temporal light field of this invention.

FIG. 10 illustrates an isometric view of an exemplary embodiment of a 3D/2D switchable light field camera implemented by tiling a multiplicity of the spatio-temporal light field cameras of this invention.

DETAILED DESCRIPTION OF THE PREFERRED EMBODIMENTS

Figure 3:
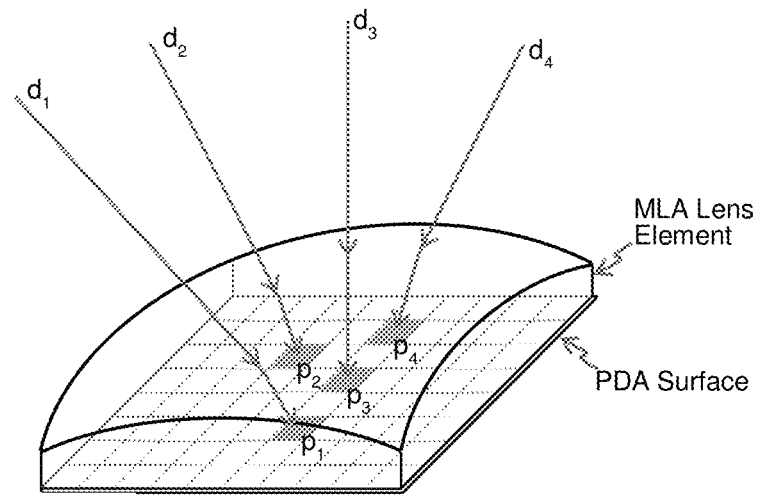
FIG. 3 illustrates the directional light field capture aspects of the spatio-temporal light field camera of this invention.

An objective of this invention, therefore, is to introduce novel light field cameras that are compact enough to readily fit in mobile devices. It is also an objective of this patent to introduce new concepts of light field photography that emerge from being able to embed the ultra compact light field cameras of this invention in networked mobile devices.

References in the following detailed description of the present invention to "one embodiment" or "an embodiment" mean that a particular feature, structure, or characteristics described in connection with the embodiment is included in at least one embodiment of the invention. The appearances of the phrase "in one embodiment" in various places in this detailed description are not necessarily all referring to the same embodiment, and many aspects are applicable to all embodiments.

A new class of light field cameras, referred to as spatio-temporal light field cameras, is described herein. Similar to prior art light field cameras, such as the plenoptic camera or the radiance camera briefly described earlier, the spatio-temporal light field cameras of this invention are also based on the use of high pixel density photo-detector array (PDA) device to record the images it captures. Therefore, within the context of this invention the term "PDA device" is henceforth intended to mean a photo-detector device that comprises an array of micro-scale light detecting pixels. Such a high pixel density photo-detector array (PDA) device, hereinafter refer to as simply the PDA device, could either be a charge coupled device (CCD) type of light sensor or a solid state light (SSL) light sensor such as a CMOS sensor or a light sensor fabricated using III-V material. The electrical output values of the array of pixels of such a PDA device, which would be commensurate with color and intensity of light coupled into the pixel's aperture, would be addressable and collected by a drive circuitry contained within a CMOS chip (or substrate) upon which the micro-scale pixel detector array is bonded. The size of the pixels comprising the detector array of the PDA device would typically be in the range of approximately 2-10 micron in linear dimension with the typical detection surface area of the device being in the range of approximately 0.3-5 square centimeter. The electrical output values from the pixels from the micro-scale pixel array of the PDA device are individually addressable spatially, chromatically and temporally either through the drive circuitry of its CMOS substrate or though an external circuit that supports the operation of the PDA device.

The present invention combines the micro pixel array capabilities of the PDA device with passive wafer level optics (WLO) and an articulated movement of the entire assembly to create light field cameras that can perform the functionalities of any of the prior art light field cameras described earlier. As used herein, wafer level or wafer means a device or matrix of devices having a diameter of at least 2 inches, and more preferably 4 inches or more. WLO are fabricated monolithically on the wafer from polymer using ultra violet (UV) imprint lithography. Among primary advantages of WLO are the ability to fabricate small feature micro lens arrays (MLA) and the ability to precisely align multiple WLO optical elements (layers) together and with an optoelectronics device such as a PDA device. The alignment precision that can be achieved by a typical WLO fabrication technique can be less than one micron. The combination of the individual pixel addressability of the micro pixel array of the PDA and the WLO micro lens array (MLA) that can be precisely aligned with respect to the micro pixel array of the PDA eliminates the need experienced in the prior art for having the bulky objective lens in the system, thereby reducing the system volume, complexity and cost simultaneously. In this invention, directional aspects of the detected light is achieved by the combination of the angular extent achieved the WLO and the articulated movement the entire assembly.

FIG. 2 conceptually illustrates spatio-temporal light field cameras of this invention. As illustrated in FIG. 2, the spatio-temporal light field cameras of this invention are comprised of the PDA device 210 with a WLO micro lens array (MLA) 220 mounted directly on top of its detection surface aperture with the entire assembly being temporally articulated around both its x and y axis, preferably by angles within the range of $\pm\alpha_x$ and $\pm\alpha_y$; respectively. The articulation of the PDA/MLA assembly 230 as illustrated in FIG. 2 would be accomplished by placing the entire assembly on a 2-axis gimbal whereby the x-axis of the gimbal is temporally actuated by an angle within the range of $\pm\alpha_x$ and the y-axis of the gimbal is temporally actuated by an angle within the range of $\pm\alpha_y$. The x-axis and y-axis temporal articulation provided by the 2-axis gimbal will cause the directional angle of the light that impinges the top surface of the PDA/MLA assembly 230 and detected by the PDA device 210 to be temporally extended by $2\alpha_x$ around the x axis and by $2\alpha_y$ around the y axis beyond the angular extent provided by the lens elements of the MLA 220.

Referring to FIG. 3, associated with each of the micro lens elements comprising the 2-dimensional array MLA 220 is the group of individually addressable PDA pixels ($p_1, p_2, \ldots, p_n$) whereby the light detected by each of the pixels in this group of pixels would be refracted from one of the unique directions ($d_1, d_2, \ldots, d_n$) within the numerical aperture (angular extent) of their associated micro lens element. The entire micro-pixel array of the PDA device 210 would comprise a multiplicity of pixel groups ($G_1, G_2, \ldots, G_N$), herein also referred to as pixel detection groups (or synonymously pixel groups), whereby each pixel group $G_i$ would be associated with one of the 2-dimensional array MLA 220 lens elements and collectively the pixel groups ($G_1, G_2, \ldots, G_N$) would then represents the spatial detection array of the spatio-temporal light field cameras of this invention. With the temporal articulation illustrated in FIG. 2 and the one-to-one association of the individual pixels ($p_1, p_2, \ldots, p_n$) within each pixel group and the detected light directions ($d_1, d_2, \ldots, d_n$), it becomes possible for the spatio-temporal light field cameras of this invention conceptually illustrated in FIG. 2 to have associated with each of its pixel groups $G_i$ a multiplicity of temporally multiplexed directions ($d_{1i}, d_{2i}, \ldots, d_{ni}$); i=1, 2, . . . , each being individually addressable by the temporal addressing of the individual pixels ($p_1, p_2, \ldots, p_n$) within each of the pixel groups ($G_1, G_2, \ldots, G_N$). The multiplicity of PDA device pixel groups ($G_1, G_2, \ldots, G_N$) associated with the 2-dimensional array MLA 220 of FIG. 2 would then represent the spatial array of the spatio-temporal light field cameras of this invention with the temporally multiplexed directions ($d_{1i}, d_{2i}, \ldots, d_{ni}$); i=1, 2, . . . , representing the multiplicity of light detection directions individually addressable through temporal addressability of the pixels ($p_1, p_2, \ldots, p_n$) of the PDA device 210 comprising each pixel modulation group. In other words, the spatio-temporal light field cameras of this invention would be able to spatially detect light through addressability of the PDA pixel groups ($G_1, G_2, \ldots, G_N$) and directionally detect the light from each pixel group in the directions ($d_{1i}, d_{2i}, \ldots, d_{ni}$); $i=1, 2, \ldots$, through temporal addressability of the pixels ($p_1, p_2, \ldots, p_n$) comprising each pixel group. Therefore, the spatio-temporal light field cameras of the invention illustrated in FIG. 2 would be able to detect light both spatially and directionally, whereby the light detected by each of the spatial locations that equals the detection area of the PDA each of the pixel groups ($G_1, G_2, \ldots, G_N$) is individually addressable through the addressability of the pixel groups as well as the directionally addressable through the temporal addressability of the individual pixel within each pixel group.

Figure 4A:
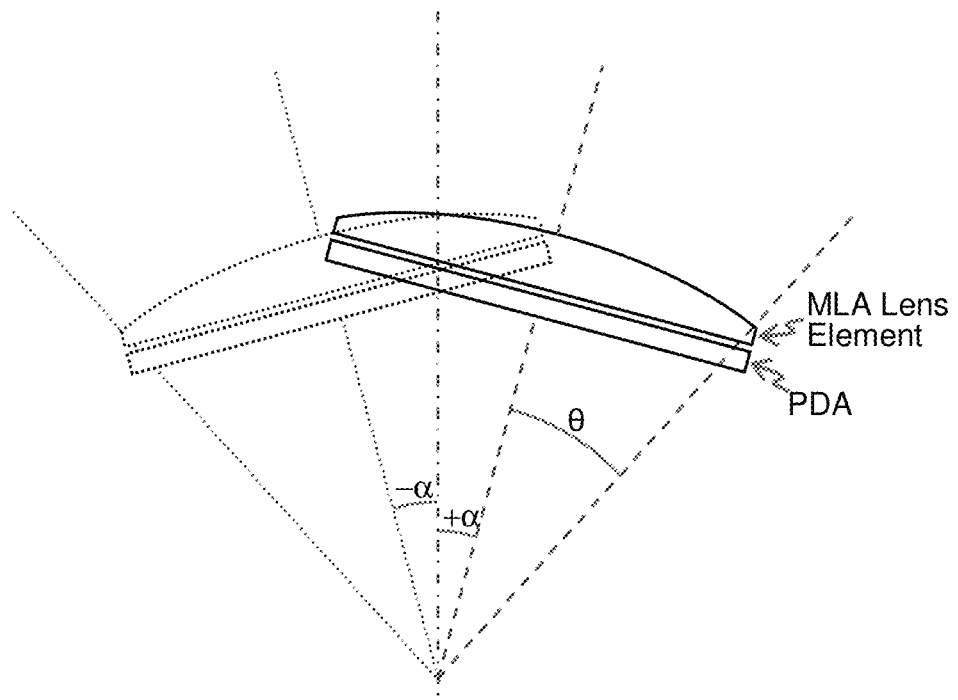
FIG. 4A illustrates the angular extent expansion made possible by the temporal articulation aspects of the spatio-temporal light field camera of this invention.

The x axis and y axis articulation of the PDA/MLA assembly 230 as illustrated in FIG. 2 will cause its light detection capabilities from the directions ($d_1, d_2, \ldots, d_n$) to be temporally multiplexed into the multiplicity of light directions ($d_{1i}, d_{2i}, \ldots, d_{ni}$); $i=1, 2, \ldots$, which extend over the angular extent provided by the lens elements of the MLA 220 plus $2\alpha_x$ in the x direction and by $2\alpha_y$ in the y directions. This is illustrated in FIG. 4A which shows the temporal expansion of the PDA/MLA assembly 230 angular extent along one articulation axis, for the purpose of illustration. Referring to FIG. 4A, the angle $\theta$ represents the angular extent of one lens element of the MLA 220 and the angle $\alpha$ represents the composite instantaneous articulation angle of the lens element as a result of the gimbal articulation by the angles $\alpha_x(t)$ and $\alpha_y(t)$ around the x-axis and the y-axis, respectively. The articulation of PDA/MLA assembly 230 as illustrated in FIG. 2 and explained by FIG. 4A enable the micro-scale pixels within the detection array of the PDA device 210, which are individually addressable through the PDA drive circuitry, to detect light both spatially, chromatically and directionally, whereby the angular extent of the directionally detected light is temporally expanded by an angle $2\alpha_x$ in the x direction and by an angle $2\alpha_y$ in the y direction beyond the angular extent $\theta$ (or numerical aperture) of the lens elements of the MLA 220. Furthermore, temporal articulation of the PDA/MLA assembly 230 of the spatio-temporal light field cameras 200 of this invention would temporally increase the detectable number of light directions ($d_1, d_2, \ldots, d_n$) by the ratio of the angular extent expansion in each articulation direction expressed as $(\theta+\alpha_x)(\theta+\alpha_y)/\theta^2$.

Figure 4B:
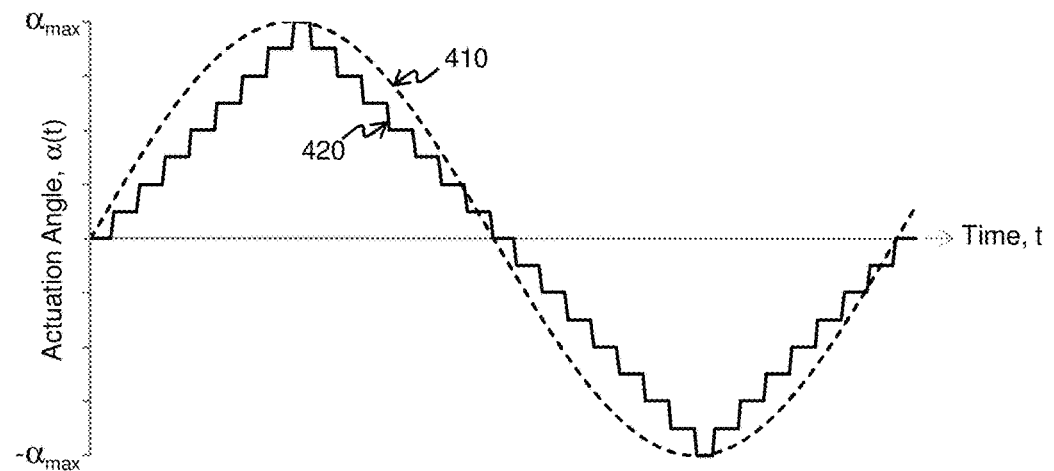
FIG. 4B illustrates an exemplary angular temporal articulation of the spatio-temporal light field camera of this invention.
Figure 5:
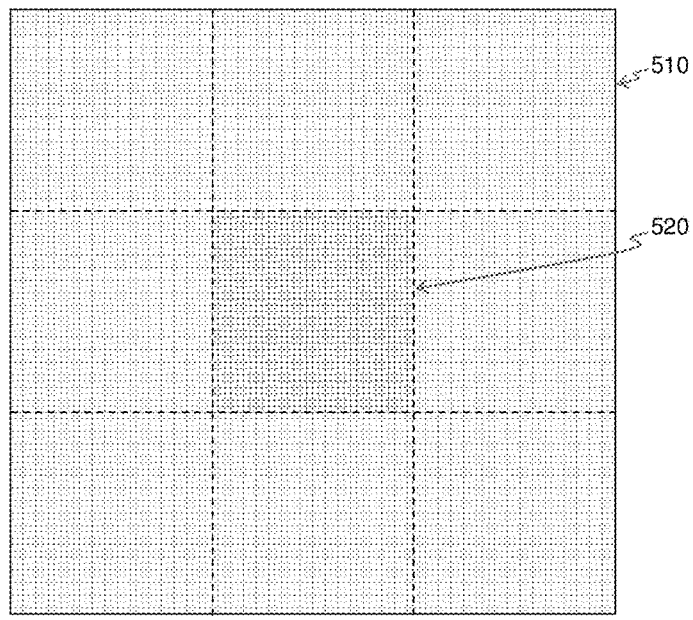
FIG. 5 illustrates the extended angular coverage cross section of the spatio-temporal light field camera of this invention.

The 2-axis articulation of the PDA/MLA assembly 230 of the spatio-temporal light field 200 of this invention can be in either temporally continuous or discrete (stepwise). FIG. 4B illustrates the composite temporal articulation angle $\alpha(t)$ of the PDA/MLA assembly 230 in one axis, for the purpose of illustration, when the articulation is temporally continuous 410 and when the actuation is temporally discrete 420. When the temporal articulation of the spatio-temporal light field cameras 200 of this invention is discrete or stepwise (420), the typical angular step size would preferably be proportional with the ratio of the angular extent $\theta$ of the MLA 220 to spatial resolution the PDA/MLA assembly 230. As illustrated in FIG. 5, the temporal articulation of the PDA/MLA assembly 230 of the spatio-temporal light field cameras of this invention would typically be a repetitive (or periodic) and independent around each of the 2-axis. The repetition periods of the articulation of the spatio-temporal light field cameras of this invention would typically be proportional to and synchronized with a predefined output data frame duration (for the purpose of reference, the image data from a typical video camera outputted at 60 frames per seconds and is often referred to as 60 Hz frame rate output).

The maximum values $\pm\alpha_{max}$ of the temporal articulation illustrated in FIG. 4B would determine the full angular extent that can be provided by the spatio-temporal light field cameras, which is determined by the value $\pm(\theta+\alpha_{max})$, where the angle the angle $\theta$ represents the angular extent of the lens elements of the MLA 220. The periodicity of the x-axis and y-axis articulation collectively would typically be selected to enable temporal coverage of the desired full angular extent of the spatio-temporal light field cameras 200 of this invention within the required image frame capture duration. In still image capture (photography) the shutter speed would be the parameter equivalent to the image frame capture duration referred to in the preceding discussion. Meaning that when the spatio-temporal light field cameras 200 of this invention are used in still image photography, image frame capture duration will be equivalent to the shutter speed in conventional cameras.

FIG. 5 illustrates the angular coverage cross section 510 of the PDA/MLA assembly 230 of the spatio-temporal light field cameras 200 of this invention being comprised of the temporal multiplicity of the angular coverage cross section 520 of the MLA lens element. Appropriately selected temporal articulation $\alpha_x(t)$ and $\alpha_y(t)$ of the PDA/MLA assembly 230 around its x-axis and y-axis; respectively, will generate the angular coverage 510 that is comprised of the multiplicity of the temporally multiplexed angular coverage 520 of the MLA 210 lens element. Depending on the magnitude of the angular articulation $\alpha_x$ and $\alpha_y$ of the PDA/MLA assembly 230 around their x and y axes, the shape of the angular coverage cross section 510 can be tailored in aspect ratio. The articulation rate around the x and y directions would be sufficient to ensure that the temporal light detection directions within the angular coverage 510 have adequate duty cycle within the required image capture frame duration. For example, when the required image capture frame duration is 60 image frames per second, which is typically referred to as 60 Hz image frame rate, each of the light directions within each of the temporal angular coverage 520 illustrated in FIG. 5 will need to be detected once per frame, thus making the articulation rate required to generate angular coverage illustrated in FIG. 5 to be at least 180 Hz around either the x or the y axis. In other words, for the angular coverage example illustrated in FIG. 5 where the size of the temporal angular coverage 510 is three times the size of angular coverage 520 in each axis, the articulation rate around either the x or the y directions for the illustration of FIG. 5 would need to be at least three times the image capture frame rate. The angular coverage 520 of the MLA lens element can be either overlapping or non-overlapping. In general the articulation rate of the PDA/MLA assembly 230 around either the x or y axis would have to be at least equal to the image capture frame rate multiplied by a factor that equals the ratio of the size (in degrees) of the angular coverage 510 along each axis to the size (in degrees) of the angular coverage 520 along the same axis.

Referring to FIG. 5, with the temporal articulation of the PDA/MLA assembly 230 of the spatio-temporal light field cameras 200 of this invention having the angular coverage 520 and comprising the multiplicity of light detection directions corresponding to the multiplicity of spatial pixels groups comprising the PDA device 210, a new set of light detection directions would be continuously added as some drop off temporally in a pipeline fashion until the full angular extent 510 of the spatio-temporal light field cameras 200 of this invention is fully covered. At any given instant the full aperture of the PDA/MLA assembly 230 would be utilized to accumulate the light from any given direction as that direction remains temporally within the coverage of the articulated aperture 510. As a result of this spatio-temporal pipelining of the multiplicity of the detection of light directions, the response time of the spatio-temporal light field cameras 200 of this invention can be made to be commensurate with the image capture frame rate with minimal latency. The time duration a given light capture direction remains within the angular coverage 520 would determine the integration time available for the capture of the light intensity entering the spatio-temporal light field cameras 200 from that direction. As a result, unless compensated, the light directions within the peripheral area of the full angular coverage 510 could have less integration time, and therefore intensity, than the interior region of the angular coverage 520. This intensity edge tapering effect would be somewhat similar to the Fresnel losses typically encountered at the edge of an optical system except in the case of the spatio-temporal light field cameras 200 of this invention, such an effect can be compensated by appropriate selection of the rate of the temporal articulation of the PDA/MLA assembly 230 of the spatio-temporal light field cameras 200 of this invention.

As an alternative, the temporal angular articulation may be by way of a sort of step and repeat process wherein the temporal angular articulation is in angular steps. This equalizes the time of exposure of each pixel to light from overall field of view. As a still further alternative, the temporal angular articulation may be by way of a sinusoidal variation, with a pause at the maximum articulation positions so that the exposure times of the pixel groups at the maximum articulation positions is increased.

One embodiment of this invention, herein referred to as 600, is illustrated in FIG. 6, which includes an isometric, top view and side view illustrations of this embodiment. As illustrated in FIG. 6, the spatio-temporal light field cameras of this invention are realized by bonding the PDA/MLA assembly 230 (depicted in FIG. 2) on the topside of the 2-axis gimbal assembly 620 which is fabricated using multiple silicon substrate layers; namely, a hinge layer 621, a spacer layer 628 and a base layer 630. As illustrated in FIG. 6, the hinge layer 621 of the 2-axis gimbal 620 is comprised of an outer frame 622, an inner ring 623 and the inner segment 625 upon which PDA/MLA assembly 230 would be bonded (625 is hereinafter also referred to synonymously as the bonding pad 625). The gaps between the outer frame 622, the inner ring 623 and the inner segment 625 would be etched using standard semiconductor lithography techniques. The inner segment 625 is physically connected along the x-axis to the inner ring 623 by two silicon bridges 622, each typically approximately in the range of 0.3-0.5 mm wide, which would act as the x-axis hinge and would also to define the neutral x-axis position of the gimbal and act as a mechanical resistance spring for the x-axis articulation. The inner ring 623 is connected along the y-axis to the outer frame 622 by two silicon bridges 626, each typically approximately in the range of 0.3-0.5 mm wide, which would act as the y-axis hinge and would also to define the neutral y-axis position of the gimbal and act as a mechanical resistance spring for the y-axis articulation. The two pairs of silicon hinges 624 and 626 constitute the pivot points of the 2-axis gimbal around which the x and y articulation would be performed. The interior segment 625 of the hinge layer 621 of the gimbal assembly 620 contains a multiplicity of contact pads to which the PDA/MLA assembly 230 is bonded using standard soldering techniques such as flip chip solder balls, thus making the inner segment 625 become the bonding pad upon which PDA/MLA assembly 230 would be bonded. Embedded within the interior segment 625 of the hinge layer 621 of the gimbal assembly 620 are a multiplicity of metal rails which connect a set of contact pads on the topside of the interior segment 625 to a set of device contact pads 627 placed along the periphery of the outer frame 622 via the x-axis and y-axis hinge bridge areas 624 and 626. The set of contact pads on the topside of the interior segment 625 are the contact pads that would provide electrical and physical contact to the backside of the PDA/MLA assembly 230.

Referring to the side view illustration of FIG. 6, the PDA/MLA assembly 230 is shown bonded to the topside of the interior segment 625. As explained earlier, this would be both an electrical and physical contact bonding between the contact pads on the topside of the interior segment 625 and the contact pad at the backside of the PDA/MLA assembly 610 using solder or eutectic ball grid array type bonding. Also illustrated in FIG. 6 side view is the spacer layer 628 which would be bonded at wafer level with the base layer 630 topside and with the hinge layer backside using BenzoCycloButene (BCB) polymer adhesive bonding or the like. The height (or thickness) of the spacer layer 626 would be selected to accommodate the vertical displacement of the corner of the hinged interior segment 625 together with the bonded PDA/MLA assembly 610 at the maximum actuation angle. For example, if the diagonal of the bonding pad 625 measures 5 mm and the maximum articulation angle at the corner is 15°, then the thickness of the spacer layer 626 should measure approximately 0.65 mm in order accommodate the vertical displacement of the corner of the bonding pad 625 at the maximum articulation angle.

Referring to the side view illustration of FIG. 6, the articulation of the bonding pad 625 together with the bonded PDA/MLA assembly 230 would be accomplished using a set of electromagnets 635 placed at the four corners of the backside of the hinged bonding pad 625, and a set of permanent magnets 636 placed on the topside of base layer 630 in alignment with the four corners of the backside of the hinged bonding pad 625. The electromagnets 635 would be a coil having a metal core formed at wafer level using multilayer imprint lithography on the backside of the hinged bonding pad 625. The permanent magnets 636 would be a thin magnetic strip typically of neodymium magnet ($Nd_2Fe_{14}B$) or the like. Articulation of the hinged bonding pad 625 together with the bonded PDA/MLA assembly 230 as described earlier would be accomplished by driving the set of electromagnets 635 with an electrical signal having the appropriate temporal amplitude variation to affect the appropriate temporal variation in the magnetic attraction between the set of electromagnets 635 and permanent magnets 636 that would cause the hinged bonding pad 625 together with the bonded PDA/MLA assembly 230 to be temporally articulated as described earlier. The drive electrical signals to the set of electromagnets 635, which are generated either by the PDA device 210 or by an external support device, are supplied to the set of electromagnets 635 via the metal rails and contacts incorporated in the hinged interior segment 625 described earlier, and are synchronous with the image frame capture duration (rate) performed by the PDA device 210 to the extent that will enable the desired directional detection of the light on the pixel array of the PDA device 210. The temporal variation of the drive electrical signals to the set of electromagnets 635 would be selected to enable the temporal angular articulation of the hinged bonding pad 625 together with the bonded PDA/MLA assembly 230 around both of their x-axis and y-axis as illustrated in FIG. 6. Depending on the thickness of the silicon substrate of the hinge layer 621 and the selected width of the silicon hinges 624 and 626, the maximum value $\pm\alpha_{max}$ of the temporal angular articulation $\alpha(t)$ illustrated in FIG. 4B that can be achieved by embodiment 600 of this invention would typically be in the range from $\pm 15°$ to $\pm 17°$.

The drive electrical signals to the set of electromagnets 635, which are either generated by the PDA device 210 or an external support device, are supplied to the set of electromagnets 635 via the metal rails and contacts incorporated in the hinged interior segment 625 described earlier, would be comprised of a base component and a correction component. The base component of the drive electrical signals to the set of electromagnets 635 would represent a nominal value and a correction component would be derived from an angular articulation error value generated by a set of four sensors positioned on the backside of the hinged interior segment 625 in alignment with the hinges 624 and 626. These sensors would be an array of infrared (IR) detectors placed on the backside of the hinged interior segment 625 in alignment with four IR emitters placed on the topside of the base layer 630. The output values these four IR detector arrays will be routed to either the PDA device or an external support device, again via the metal rails and contacts incorporated in the hinged interior segment 625 described earlier, and are used to compute an estimate of the error between the derived and the actual articulation angle which will be incorporated as a correction to the drive signals provided by either the PDA device or an external support device to the set of electromagnets 635. The sensors positioned on the backside of the hinged interior segment 625 could also be micro-scale gyros properly aligned to detect the actuation angle along each of the 2-axis of the gimbal.

Another embodiment of this invention is illustrated in FIG. 7, herein referred to as 700. FIG. 7 includes isometric views and side view illustrations of this embodiment. As illustrated in FIG. 7, the embodiment 700 of this invention is comprised of the 2-axis gimbal 720 with the PDA/MLA assembly 230 bonded on top of it. FIG. 7 also shows an exploded isometric illustration of the embodiment 700 that shows the constituent layers of the 2-axis gimbal 720 of this embodiment. As illustrated in FIG. 7, the spatio-temporal light field cameras of this embodiment are realized by bonding the PDA/MLA assembly 230 (depicted in FIG. 2) on the topside of the 2-axis gimbal assembly 720 which is fabricated using multiple silicon substrate layers; namely, a pad layer 721, a spring layer 725 and a base layer 730. The topside of the pad layer 721 incorporates multiplicity of contact pads to which the PDA/MLA assembly 230 is to be bonded using standard soldering techniques such as flip chip solder balls, thus making the topside of the pad layer 721 being the bonding pad 723 upon which PDA/MLA assembly 230 is bonded. The backside of the pad layer 721 incorporates the spherical pivot 735 which would be formed by embossing polycarbonate polymer on the backside of the hinged pad layer 721 at the wafer level using UV imprint lithography or the like. The pad layer 712 together with the spherical pivot 735 embossed on its backside will be referred to as hinged pad 721/735. The topside of the base layer 730 incorporates the spherical socket 736 which would be formed by embossing of polycarbonate polymer on the topside of the base layer 730 at the wafer. The base layer 730 together with the spherical socket 736 embossed on its topside will be referred to as the pedestal 730/736. The surface curvature the spherical pivot 735 incorporated on the backside of the pad layer 721 and the spherical socket 736 incorporated on the topside of the base layer 730 will be matched in order to allow the hinged pad 721/735 to make it 2-axis articulated pad when placed on top of the pedestal 730/736. Although the embossed surfaces of the spherical pivot 735 and socket 736 will be of optical quality in terms of surface roughness in the order of a few nm RMS, possible friction between the two surfaces due to the articulation movement would be reduced by coating the surfaces of the spherical pivot 735 and socket 736 with a thin layer (50-100 nm) of graphite.

The hinged pad 721/735 is retained in place within the surface curvature of the pedestal 730/736 by the spring layer 725 which contains at each of its four corners a single spiral shaped spring 726 that is etched into the spring layer 725. As illustrated in FIG. 7 exploded view isometric, the inner end of each of the four spiral shaped springs incorporates an inner bonding pad 727 which corresponds to an identical bonding pad 722 located at the backside of the pad layer 721. Embedded within the spiral shaped springs 726 are multiple metal rails which are used to route the electrical interface signals from the inner bonding pad 727 to a set of contact pads 728 located at the peripheral edge of the backside of the spring layer 725. The edge contacts 728 on the backside of the outer end of the spring layer 725 correspond to a matching set of bonding pads 729 that are located at the peripheral edge of the base layer 730. The edge contacts on the topside of the base layer 730 are connected via metal rails embedded within the base layer to a set of device contact pads 731 that are located on the backside of the base layer 730. In the final assembly of the embodiment 700 of this invention, illustrated in the side view of FIG. 7, the four spiral shaped springs 726 will be expanded when the backside of bonding pads 726 of the spring layer 725 are bonded to the topside bonding pads 729 of the base layer 730 and the inner bonding pad 727 of the spiral spring 726 is bonded to the corresponding bonding pad 722 on the backside of the pad layer 721. When the spring layer 725 is bonded to the backside of the pad layer 721 and to the topside of the base layer 730 spiral springs 726 as just explained, the four spiral springs become fully expanded and in that full expanded configuration they serve the multiple purposes of: (1) creating a spring load resistance needed to keep the spherical pivot 735 retained within the spherical socket 736; (2) creating the mechanical balance needed for sustaining the neutral position of the hinged pad 721/735; and (3) routing the electrical interface signals from the device contact pads 731 to the contact pad 723 of the PDA/MLA assembly 230. Referring to the side view illustration of FIG. 7, the PDA/MLA assembly 230 is shown bonded to the topside contact pad 723 of the pad layer 721. This would be both an electrical and physical contact bonding between the contact pads 723 and the contact pad at the backside of the PDA/MLA assembly 230 using solder or eutectic ball grid array type bonding. In the operational configuration the full device assembly 700 would be bonded using the contact pad 731 located on the backside of the base layer to a substrate or printed circuit board using solder or eutectic ball grid array type bonding.

Also illustrated in FIG. 7 side view is the extended height of the spherical socket 736 which would be selected to accommodate the vertical displacement of the corner of the hinged pad 721/735 together with the bonded PDA/MLA assembly 230 at the maximum actuation angle. For example, if the diagonal of the hinged pad 721/735 together with the bonded PDA/MLA assembly 230 measures 5 mm and the maximum actuation angle at the corner is $\pm 30°$, then the thickness of the extended height of the spherical socket 736 should measure approximately 1.25 mm in order to accommodate the vertical displacement of the corner of the of the hinged pad 721/735 together with the bonded PDA/MLA assembly 710 at the maximum actuation angle.

The actuation of the hinged pad 721 together with the bonded PDA/MLA assembly 230 would be accomplished using a set of electromagnets embedded within the spherical pivot 735 and a set of permanent magnets embedded within the spherical socket 736. The actuation electrical drive signal would be routed to electromagnets embedded within the spherical pivot 735 in order to affect the actuation movement described in the earlier paragraphs. The base component of the actuation electrical drive signals to the electromagnets embedded within the spherical pivot 735 would represent a nominal value and a correction component that would be derived from an angular articulation error value generated by a set of four sensors positioned on the backside of the hinged pad 721. These sensors are an array of infrared (IR) detectors placed on the backside of the hinged pad 721 in alignment with four IR emitters placed on the topside of the base layer 730. The output values these four IR detector arrays will be routed to the PDA device or an external support device, again via the metal rails and contacts incorporated in the hinged pad 721 described earlier, and used to compute an estimate of the error between the derived and the actual articulation angle which will be incorporated as a correction to the drive signals provided by the PDA device to the set of electromagnets embedded within the spherical pivot 735. The sensors positioned on the backside of the hinged pad 721 could also be micro-scale gyros, implemented using micro-electro mechanical systems (MEMS) or piezoelectric micro gyroscopes, properly aligned to detect the actuation angle along each of the 2-axis of the gimbal.

The permanent magnets embedded within the spherical socket 736 would be thin magnetic rods or wires, typically of neodymium magnet ($Nd_2Fe_{14}B$) or the like, and would be shaped to provide a uniform magnetic field across the curved cavity of the spherical socket 736. Actuation of the hinged pad 721 together with the bonded PDA/MLA assembly 230 as described earlier would be accomplished by driving the set of electromagnets embedded within the spherical pivot 735 with an electrical signal having the appropriate temporal amplitude variation to affect the appropriate temporal variation in the magnetic attraction between the set of electromagnets embedded within the spherical pivot 735 and permanent magnets embedded within the spherical socket 736 that would cause of the hinged pad 721 together with the bonded PDA/MLA assembly 230 to be temporally articulated as described earlier. The drive electrical signals to the set of electromagnets embedded within the spherical pivot 735, which are generated by either the PDA device or an external support device and routed via the metal rails and contacts incorporated the hinged pad 721 described earlier, would be made synchronous with the image frame capture duration (rate) performed by the PDA device 210 to the extent that will enable the desired directional detection of the light on the pixel array of the PDA device 210. The temporal variation of the drive electrical signals for the set of electromagnets embedded within the spherical pivot 735 would be selected to enable the temporal angular articulation of the hinged pad 721 together with the bonded PDA/MLA assembly 230 along both of their x-axis and y-axis as illustrated in FIG. 6. Depending on the extended height of the spherical socket 736 which governs the maximum vertical displacement of the corner of the hinged pad 721 together with the bonded PDA/MLA assembly 230, the maximum value $\pm\alpha_{max}$ of the temporal angular articulation $\alpha(t)$ illustrated in FIG. 6 that can be achieved by the embodiment 700 of this invention would typically be in the range from $\pm 30°$ to $\pm 35°$.

A person skilled in the art would know that the gimbal actuators of the embodiments 600 and 700 of this invention described in the previous paragraphs can be implemented to achieve substantially the same objective by exchanging the positions of the electromagnets and the permanent magnets. Furthermore, a person skilled in the art would also know that the gimbal actuators of the embodiments 600 and 700 of this invention described in the previous paragraphs can be implemented to achieve substantially the same objective using actuation drive methods other than the electromagnet based method described in the previous paragraphs.

The two embodiments 600 and 700 of the spatio-temporal light field cameras of this invention differ mainly in the maximum value $\alpha_{max}$ of the temporal angular articulation $\alpha(t)$ each can achieve and in the outer area each embodiment extends beyond the boundary of the PDA/MLA assembly 230. First, as illustrated in FIG. 7, in the embodiment 700 of this invention the 2-axis gimbal is fully accommodated within the footprint area of the PDA/MLA assembly 230 (hereinafter refer to a zero-edge feature) while as illustrated in FIG. 6 in the embodiment 600 of this invention the 2-axis gimbal is accommodated at the outer periphery of the PDA/MLA assembly 230 outer boundary. Second, the maximum value $\alpha_{max}$ of the temporal angular articulation $\alpha(t)$ embodiment 700 can achieve could possibly be twice as large as what could be provided for embodiment 600. Of course the larger maximum value $\alpha_{max}$ of the temporal angular articulation $\alpha(t)$ that can be accomplished by the embodiment 700 comes at the expense of requiring larger vertical height than the embodiment 600. The zero-edge feature of the embodiment 700 makes it more suitable for being tiled to create a large aperture light field camera (as will be explained in later paragraphs) while the low profile (low height) feature of the embodiment 600 makes it more suitable for creating an ultra compact light field camera for mobile applications.

Figure 8A:
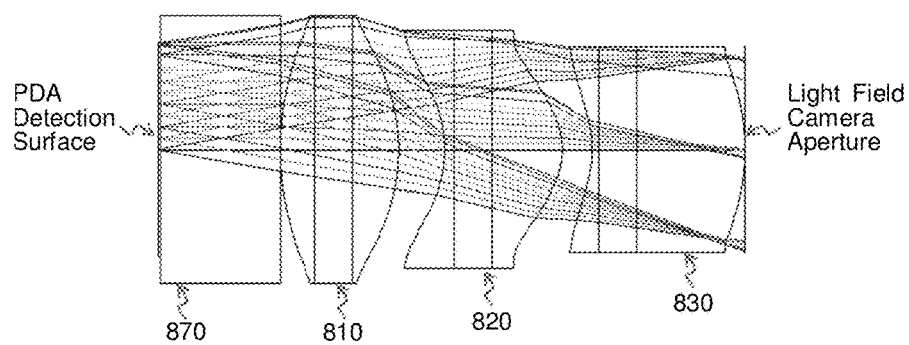
FIG. 8A illustrates an exemplary design of the lens element of the micro lens array of the spatio-temporal light field camera of this invention.

FIG. 8A shows an exemplary embodiment of one element of the MLA 220 and its associated pixel group $G_i$ of the PDA device 210 that can be used within the context of the present invention. Referring to FIG. 8A, as explained earlier the light detected by each individual pixel within a pixel group $G_i$ reaches the surface of the PDA device 210 through the aperture of a micro lens element that comprises the three optical elements 810, 820 and 830. Each light bundle that traverses a specific direction and impinges the aperture of the MLA 220 within a angular extent $\delta\theta$, which is referred to herein as the angular resolution of the light field cameras of this invention, would be collimated by the MLA 220 micro lens system 810, 820 and 830 and reach one of the individual pixels within a pixel group $G_i$ of the PDA device 210. In essence the micro lens system illustrated in FIG. 8A comprising the optical elements 810, 820 and 830 would map the incident light from the multiplicity of directions within the light field defined by an exemplary $\theta=\pm 15°$ angular extent of the MLA 220 micro lens system 810, 820 and 830 to the individual pixels comprising the two dimensional pixels of the pixel group $G_i$ (see FIG. 3). It should be noted that in order to capture the full depth of the light field, the MLA 220 micro lens system 810, 820 and 830 is designed to have an infinite depth of focus (i.e., focused on infinity).

To a person skilled in the art, the exemplary embodiment of one element of the MLA 220, illustrated in FIG. 8A comprising micro lens system 810, 820 and 830, would be known to as a Fourier optical system because it maps the directional aspects of the light field that impinges the aperture of the MLA 220 within the angular extent θ, which in the case of exemplary embodiment of FIG. 8A is an exemplary ±15°, into the two dimensional spatial array of the pixels comprising the pixel group $G_i$ of the PDA device 210 that is associated with that MLA 220 micro lens element. In essence the MLA 220 of the light field cameras of this invention is an array of micro-scale Fourier lenses, or a Fourier micro lens array. As explained earlier, the MLA 220 would be comprised of a multiplicity of the elements each being comprised of exemplary lens system 810, 820 and 830 whereby each of the MLA 220 would be associated with one of pixels within a pixel group $G_i$ comprising the PDA device 210. With each one of the MLA 220 micro lens elements, which could be comprised of the exemplary lens system 810, 820 and 830, mapping the light field that impinges its aperture within the angular extent θ into the two dimensional array of the pixel group $G_i$ associated with it, the PDA/MLA assembly 230 of the spatio-temporal light field cameras of this invention would be able to capture light field that impinges on its aperture within the angular extent θ with a directional resolution that equals the total number of pixels $(p_1, p_2, \ldots, p_n)$ comprising each of the pixel array groups $G_i$ and a spatial resolution that equals the total number of pixel groups $(G_1, G_2, \ldots, G_N)$ comprising the PDA device 210. In other words the PDA/MLA assembly 230 of the spatio-temporal light field cameras of this invention would be able to capture a multiplicity of views, that equals to the number n of pixels comprising each of the pixel groups $G_i$, of the light field that impinges its aperture within a solid angle θ with the spatial resolution of each of the views it captures being equal to the number N of pixel groups comprising the PDA device 210. As explained earlier, when the PDA/MLA assembly 230 is used within the context of the either of the embodiments 600 or 700 having a maximum temporal articulation of $\alpha_{max}=\pm 15°$, for example, the angular extent of this the exemplary embodiment of the light field cameras of the this invention would be $\pm(\theta+\alpha_{max})=\pm 30°$ and the number of views it can capture would be $$\left[\frac{(\Theta+\alpha_{max})^2}{\Theta^2}\right]n = 4n$$

views each being captured with a spatial resolution N.

The angular extent θ of the MLA 220 exemplary embodiment comprising micro lens system 810, 820 and 830 of FIG. 8A can be made either larger or smaller than the ±15° through appropriate design selection of the refracting surfaces of the micro lens system 810, 820 and 830 or by increasing or decreasing the number of its optical elements. It should be noted, however, that for a given directional resolution, which is herein defined as the number of directional views determined by the number of pixels within the pixel modulation group $G_i$, changing the angular extent θ of the MLA 220 micro lens system would result in a change in the angular separation between the directional views, which is herein defined as the angular resolution, detected by the PDA/MLA assembly 230 of the spatio-temporal light field cameras of this invention. For example with the θ=±15° angular extent of the previous exemplary embodiment, if the pixel group $G_i$ comprises (16×16) pixels, then the angular separation (or angular resolution) between the directional light beam detected by the PDA/MLA assembly 230 of the spatio-temporal light field cameras of this invention would be approximately δθ=1.875°. This same angular resolution value of δθ=1.785° can also be achieved by reducing the angular extent of the MLA 220 micro lens system to θ=±7.5° and the number of pixels comprising the pixel group $G_i$ to (8×8) pixels. In general using a higher optical aperture F/# (i.e., smaller value of the angular extent θ) for the MLA 220 micro lens system would allow achieving a given angular resolution value using a smaller pixel group $G_i$ size, which in turn would result in the availability of more pixels within a given pixel resolution of the PDA device 210 to create more of the pixel groups $G_i$ and consequently allow higher spatial resolution.

This design tradeoff allows selecting the appropriate balance between the optical aperture F/# of the MLA 220 micro lens system design parameters and spatial resolution that can be achieved by the PDA/MLA assembly 230. On the other hand, when the optical aperture F/# of the MLA 220 micro lens system is increased to increase the spatial resolution, as just explained, the angular extent that can be achieved by the PDA/MLA 220 of the spatio-temporal light field cameras of this invention would be reduced. At this point the maximum value $\alpha_{max}$ of the temporal angular articulation α(t) of this invention will become a part of the design tradeoff to recover the angular extent sacrificed in favor of increasing the spatial resolution. In the previous example when the maximum value $\alpha_{max}$ of the articulation angle is selected to be $\alpha_{max}=\pm 7.5°$, the spatio-temporal light field cameras of this invention will be able to achieve an full angular extent of $(\alpha_{max}+\theta)=\pm 15°$ using the pixel group $G_i$ of (8×8) pixels. In essence for a given angular resolution value of δθ, the maximum value of the articulation angle $\alpha_{max}$ comes into the tradeoff as a parameter that can be used either to increase the angular extent or the spatial resolution that can be achieved by the spatio-temporal light field cameras of this invention, or a combination of the angular extent and the spatial resolution. Of course suitable actuators for the angular articulation are not necessarily limited to electro-magnetic actuators, but other types of actuators may be used if desired. By way of example, particularly if the angular extent of the PDA/MLA assembly 230 is adequate and the angular articulation is used to increase the angular resolution, then the amount of angular articulation required will be quite small, namely less than the angular resolution without articulation. Consequently electro mechanical actuators that have small deflections can be used, such as piezo-electric actuators. Such actuators can be highly reliable, efficient, low cost, fast and easily controlled. They also provide fixed positions versus voltage applied, to be compared with forces proportional to current without a reference position provided by voice coil type of electromagnetic actuators, which may eliminate the need for physical gimbals, thereby further simplifying the mechanical assembly.

Figure 8B:
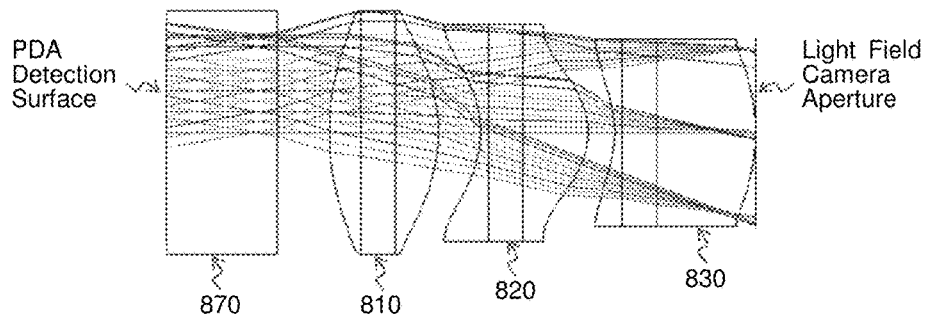
FIG. 8B illustrates an exemplary embodiment of the cross section of the full assembly of the spatio-temporal light field camera of this invention.
Figure 8C:
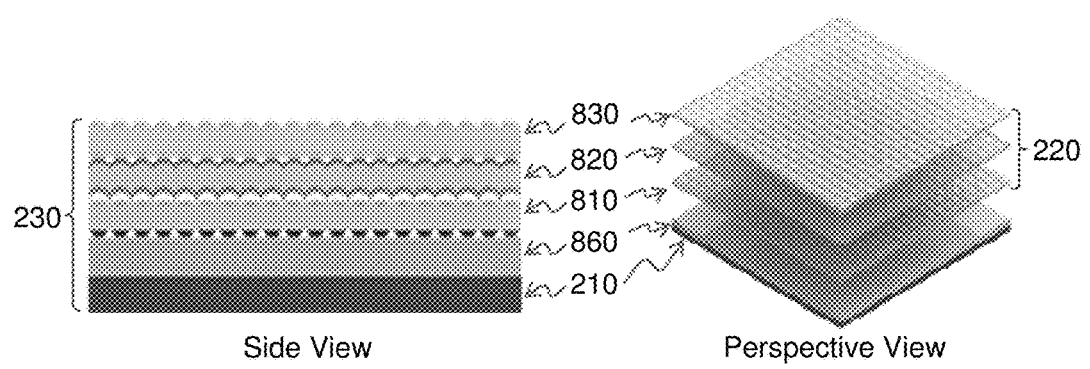
FIG. 8C illustrates a top view of an exemplary embodiment of the spatio-temporal light field camera of this invention.

FIG. 8B shows an exemplary embodiment of the full assembly of the PDA/MLA assembly 230 of the spatio-temporal light field cameras of this invention. The multiplicity of the micro lens elements 810, 820 and 830 are fabricated to form the micro lens arrays layers 840, 850 and 860 which would be precisely aligned relative to each other and relative to the associated arrays of the PDA device 210 pixel groups $(G_1, G_2, \ldots, G_N)$ at the wafer level using semiconductor aligners, which can typically achieve wafer-to-wafer alignment accuracy below 0.25 micron. The exemplary embodiment illustrated in FIG. 8B also includes the PDA device 210 and the cover layer 870, which would typically be a glass layer that is incorporated as a protective encapsulation of the PDA device 210. The design of the micro lens elements 810, 820 and 830 would take into account the thickness and optical characteristics of the PDA cover glass 870 in order to make the image be at the surface of the PDA device 210. The exemplary embodiment of FIG. 8B illustrates the full assembly of the PDA/MLA 230 that can be used within the context of the embodiments 600 or 700 of the spatio-temporal light field cameras of this invention. Using the exemplary embodiment of FIG. 8B, the typical total thickness of the embodiments 600 and 700 of the spatio-temporal light field cameras of this invention would be less than 5 mm. Such compactness of the light field cameras of this invention is not possibly achievable by any of the light field camera techniques of the prior art. It should be noted that as shown in FIG. 8C, which illustrate a top view of one quadrant of the MLA 220 comprising the micro lens arrays layers 840, 850 and 860, the center of the each of the MLA 220 lens elements are aligned with the center of their respective pixel groups $G_i$ in order to provide full angular coverage of the light field across the spatial extent of the MLA 220 without any directional coverage gaps.

Figure 8D:
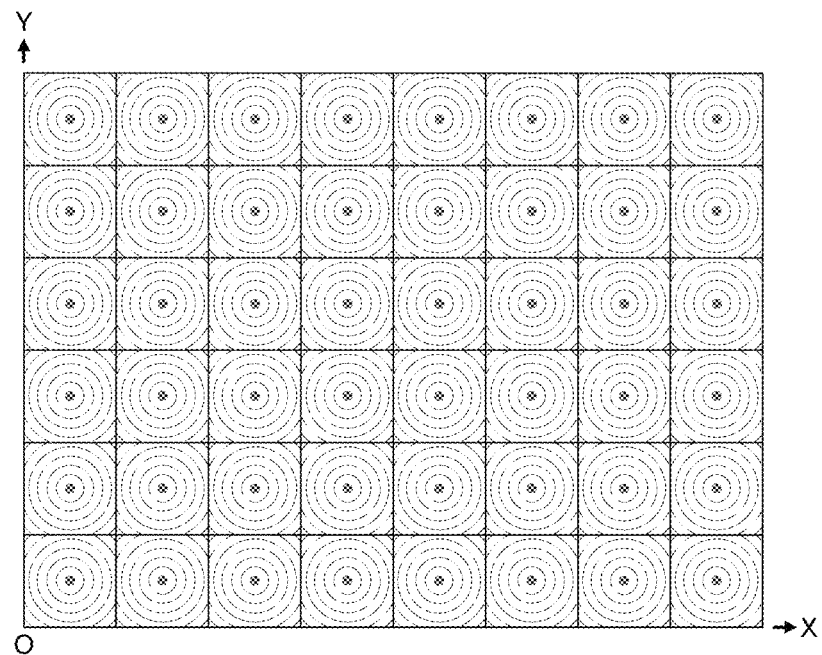
FIG. 8D illustrates an exemplary embodiment of the spatio-temporal light field camera of this invention having an on center micro lens array lens.

Another embodiment of the spatio-temporal light field cameras of this invention is illustrated in FIG. 8D which shows a top view of one quadrant of the MLA 220. In comparison with the MLA 220 micro lens element illustrated in FIG. 8C in which the lens array elements of the MLA 220 are truncated along both the x-axis and y-axis to have their cross section match the dimensional aspects of their respective pixel group $G_i$ and their optical centers are aligned with the centers of their respective pixel group $G_i$, the optical centers of the MLA 220 lens elements of the embodiment illustrated in FIG. 8D is gradually offset from the centers of their respective pixel group $G_i$. As illustrated in FIG. 8D, the lens element at the center of the MLA 220 would be aligned with the center of its respective pixel group but the lens elements away from the center of MLA 220 have their centers offset from the center of their respective pixel group with such an offset gradually increasing for lens elements further away from the center of the MLA 220. The virtue of this embodiment is that it enables yet another aspect of design tradeoff between the achievable angular resolution, directional resolution and spatial resolution of the spatio-temporal light field cameras of this invention. As explained earlier, the achievable angular resolution $\delta\theta$ would be determined by the angular extent $\theta$ of the lens elements of the MLA 220 and the directional resolution defined by the size of the pixel group $G_i$. For a given value of the angular extent $\theta$, the angular resolution $\delta\theta$ decreases and the directional resolution increases with the increase in the size of the pixel group $G_i$. Therefore, for a given size PDA device 210, in terms of the number of available pixels, increasing the achievable directional resolution would be at the expense of decreasing the achievable spatial resolution. In order to increase the directional resolution without decreasing the spatial resolution one would have to reduce the angular extent of the MLA 220, which in turn would reduce the overall angular extent of the light field cameras. The embodiment of the spatio-temporal light field cameras of this invention illustrated in FIG. 8D offers another alternative of compensating for the resultant reduction in the angular extent $\theta$ of the elements of the MLA 220, in favor of increasing the directional resolution, by gradually increasing the inclination of the field of view of the elements of the MLA 220 in order to achieve a larger overall field of view for the cameras. Increasing the inclination of the field of view of the elements of the MLA 220 is achieved, as illustrated in FIG. 8D, by gradually offsetting the centers of the MLA 220 lens elements from the centers of their respective pixel group $G_i$. However, the gradual increase in the inclination of the field of view of the elements of the MLA 220, that results from the gradual offset of the centers of the MLA 220 elements as illustrated in FIG. 8D, would result in gradually truncated directional coverage gaps from the center to the edge of the PDA device 210. On the other hand, such resultant directional coverage truncation gaps will be filled in by the temporal angular articulation of the spatio-temporal light field cameras of this invention. With the design tradeoff offered by the embodiment illustrated in FIG. 8D, therefore, it becomes possible to achieve higher directional resolution without sacrificing either the spatial resolution or the overall angular extent of the spatio-temporal light field cameras of this invention, especially given the angular extent and directional resolution expansion that can be realized by the angular temporal articulation of the spatio-temporal light field cameras of this invention.

Figure 8E:
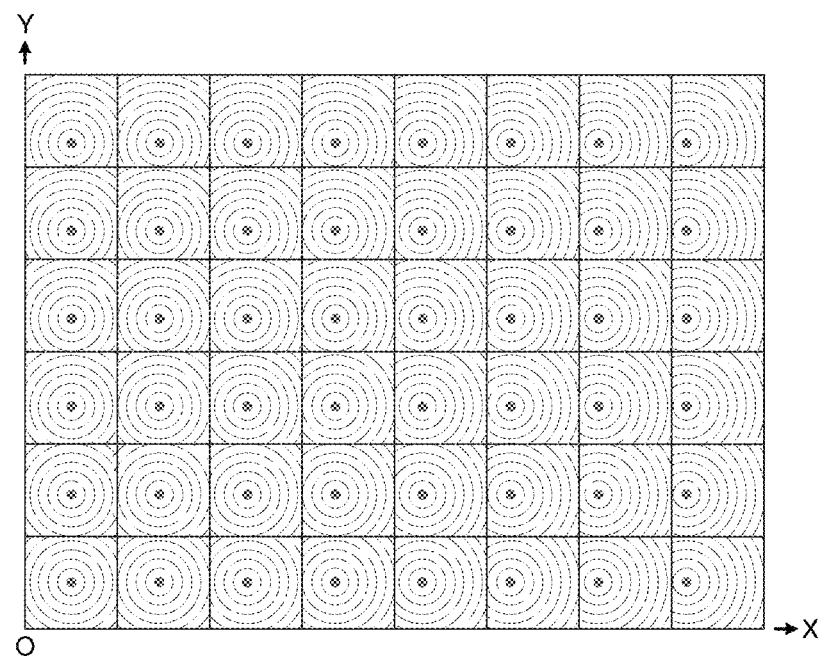
FIG. 8E illustrates an exemplary embodiment of the spatio-temporal light field camera of this invention having an offset center micro lens array lens.

It should be noted that although in the exemplary embodiment of the MLA 220 lens element illustrated in FIG. 8A the detection surface of the PDA device 210 is shown placed at the focal plane of the MLA 220 lens element, in another embodiment of this invention that is illustrated in FIG. 8E, the detection surface of the PDA device 210 is alternatively be placed a further distance away from the focal plane of the MLA 220 lens element. Furthermore, the distance between the detection surface of the PDA device 210 and the MLA 220 lens element can be also made to be adjustable, in the order of a few microns, by placing the MLA 220 assembly on a z-axis electro-mechanical actuator that would be used to vary the distance between the detection surface of the PDA device 210 and the MLA 220 lens element within a set range. Such a z-axis electro-mechanical actuator would be similar to that used as a focusing mechanism in conventional mobile cameras. As illustrated in FIG. 8E, when the distance between the detection surface of the PDA device 210 and the MLA 220 lens element is further away from the focal plane of the MLA 220 lens element, the sub-images formed by each of the MLA 220 lens elements on the detection surface of the PDA device 210 will become blurred (or de-focused), thus causing the light relayed by the MLA 220 lens element from one direction to be spread across multiple pixels within the corresponding pixel group $G_i$ and the sub-image formed by each of the lens elements of the MLA 220 on the detection surface of the PDA device 210 to be spread across the pixels expanded beyond the boundaries of their respective the pixel groups $G_i$. As a result, therefore, the directional information of the light relayed to the PDA device 210 by a given lens element of the MLA 220 will be spread across a larger number of pixels of the PDA device 210 than that of the corresponding pixel groups $G_i$ of that lens element; which in turn means that the directional information of the light relayed by the lens elements of the MLA 220 would be recorded by the PDA device 210 with higher directional resolution; or alternatively a smaller value of the angular extent $\delta\theta$ (i.e., higher angular resolution). In effect with this embodiment of the spatio-temporal light field cameras of this invention the plurality of pixels comprising each of the PDA device 220 pixel groups ($G_1, G_2, \ldots, G_N$) associated with the 2-dimensional array MLA 220 would be shared collectively in recording the light field with higher angular and directional resolutions. The higher angular resolution is achieved because the light relayed by the MLA 220 lens element from one direction is spread across multiple pixels (as illustrated in FIG. 8E), rather than being focused on only one pixel (as illustrated in FIG. 8A), thus causing the light within the angular extent $\theta$ of each of the MLA 220 elements relayed from a specific direction to be sampled by a larger number of the PDA device 210 pixels; therefore achieving a smaller value of angular extent δθ. The higher directional resolution is achieved because the sub-images formed by each of the lens elements of the MLA 220 on the detection surface of the PDA device 210 would be spread (blurred or defocused) across pixels expanded beyond the boundaries of their respective the pixel groups $G_i$, thus causing the light within the angular extent θ of each of the MLA 220 elements to be sampled with larger number of the PDA device 210 pixels, which means larger number of light directions (or views) would be detected. The information recorded by each of the pixels comprising each of the pixel groups $G_i$ would therefore be, depending on the selected distance between the PDA device 210 and the MLA 220, a known weighted sum (defined by the optical transfer function of the MLA 220 lens element) of the light field directional information relayed by a multiplicity of lens elements of the MLA 220 which can be computationally resolved. The tradeoff implied by the sub-image expansion caused by the increasing the distance between the PDA device 210 and the MLA 220 would be an increase in the computational resources needed to resolve the light field information recorded by the spatio-temporal light field cameras of this invention. With this embodiment the angular and directional resolutions of the spatio-temporal light field cameras of this invention can be selected at a given value; and thus also the computational resources needed to resolve the captured light field, by either a prior design selection of a set distance between the PDA device 210 and the MLA 220, or by operational mode adjustments of the distance between the PDA device 210 and the MLA 220 using the z-axis actuator mentioned earlier. It should be noted that in lieu of increasing the angular and/or directional resolutions of the spatio-temporal light field cameras of this invention, the embodiment of FIG. 8E can be used to reduce the size of the pixel groups $G_i$ needed to achieve a required directional or angular resolutions; thus making more of the pixels of a given size PDA device 210 become available for achieving higher spatial resolution. In essence, therefore, the embodiment of FIG. 8E when taken together with the temporal angular articulation of the spatio-temporal light field cameras of this invention would allow the angular and directional resolutions added by the temporal angular articulation to enable higher spatial resolution.

It should be noted that the spatio-temporal light field cameras of this invention differs from prior art light field cameras described earlier in many very important aspects, the most relevant are discussed herein. The first being that unlike all other prior art, the spatio-temporal light field cameras of this invention do not use an objective lens and do not rely on the principle of sampling the aperture of that objective lens, instead the spatio-temporal light field cameras of this invention use the array 220 of micro-size Fourier lens system, such as that of exemplary embodiments 800, to sample the entire light field within the angular extent of the light field camera with a maximum depth of field since the individual elements of the micro-size Fourier lens system (the MLA 220) would be focused at infinity. This approach of using an MLA 220 of micro-size Fourier lens system, such as that of exemplary embodiments 800, to directly sample the light field makes the required optical track length, which is typically commensurate with the lens aperture diameters, be rather small and typically in the order of few millimeters, unlike prior art light field cameras described earlier which typically have an optical track length in the range of 10-15 centimeter or greater. This approach, therefore, makes the spatio-temporal light field cameras of this invention realize an unprecedented volumetric advantage over all other prior art light field cameras. As explained earlier, the prior art light field cameras have the problem that their optical track length, and hence their volumetric aspects, would be rather large due to the fact that their objective lens diameter is large; a factor that also increases their optical aberration. The spatio-temporal light field cameras of this invention avoid both of these problems by using an array of smaller diameter micro-lenses array that is temporally articulated.

The second distinctive aspect of the spatio-temporal light field cameras of this invention is that unlike prior art light field cameras described earlier in which the angular extent is solely determined by their objective lens, the angular extent of the spatio-temporal light field cameras of this invention is determined by the combination of the angular extent of the MLA 220 plus the angular temporal articulation of the PDA/MLA assembly 230. That distinction makes the spatio-temporal light field cameras of this invention have several advantages that are not shared with the prior art light field cameras described earlier. The first of these advantages, which was described earlier, is that the angular articulation angle can be used either to increase the angular extent, the directional resolution, the angular resolution or the spatial resolution that can be achieved by the spatio-temporal light field cameras of this invention. This is a key advantage because it makes it possible to realize a much higher spatial resolution per view from a given PDA device than prior art light field cameras. The second of these advantages stems from the fact that the angular extent of the prior art light field cameras described earlier is solely determined by their objective lens, increasing the size of the angular extent would typically require decreasing the size of the aperture stop, which in turn would result in a reduction in the light entering the camera and a consequent increase in the signal to noise of the captured light field. In comparison, because the angular extent of the spatio-temporal light field cameras of this invention is determined by the combination of the angular extent of the MLA 220 plus the angular temporal articulation of the PDA/MLA assembly 230, the angular extent of the spatio-temporal light field cameras of this invention can be increased without reducing the signal to noise ratio of the captured light field. The third of these advantages is that the spatio-temporal pipelining of the multiplicity of light detection directions described earlier enables the light detection sensitivity and/or response time the spatio-temporal light field cameras of this invention to be made commensurate with increased image capture frame rate with minimal latency and without sacrificing the captured light field signal to noise as in the case of prior art light field cameras. The fourth of these advantages is that, through appropriate selection of the angular extent of the MLA 220 plus the angular temporal articulation of the PDA/MLA assembly 230, the spatio-temporal light field cameras of this invention can be made to capture the light field with a wide field of view that can reach ±45°. This level of wide field photography cannot be achieved by the prior art light field cameras without the use of large diameter and rather complex fish-eye wide angle lens systems that, beside significantly increasing the volumetric size of the light field camera, will also adversely impact the prior art light field camera optical performance and significantly increase its cost. It should be noted that as a result of its wide angle light field capture capabilities, the spatio-temporal light field cameras of this invention can be used to capture either wide angle 2D views (panoramic) or 3D views of a wide angle light field.

Figure 9A:
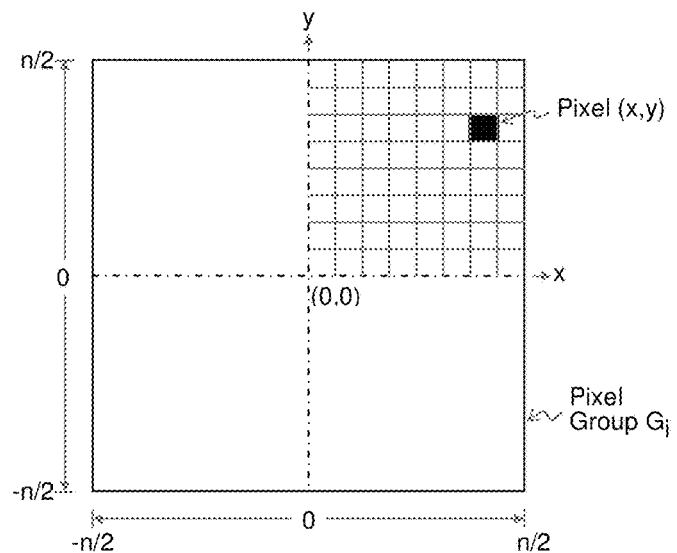
FIG. 9A illustrates an exemplary embodiment of directional addressability within one of the spatial pixel groups of the spatio-temporal light field of this invention.
Figure 9B:
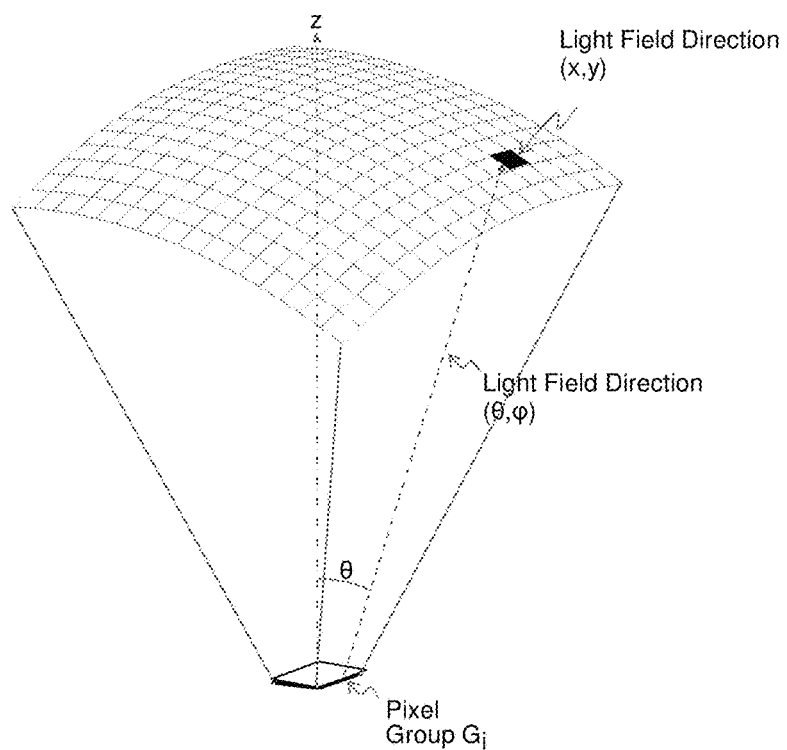
FIG. 9B illustrates an exemplary embodiment of directional addressability within one of the spatial pixel group of the spatio-temporal light field of this invention.

FIG. 9A and FIG. 9B illustrate the operational principles of the spatio-temporal light field cameras of this invention. FIG. 9A illustrates an exemplary embodiment of one of the pixel groups $G_i$ being comprised of a two dimensional array of n of the pixels of the PDA device 210 whereby for convenience the size of the pixel group $G_i$ along each axis would be selected to be $\sqrt{n}=2^m$. Referring to FIG. 9A, the directional detection addressability that can be achieved by the pixel group $G_i$ would be accomplished through the addressability of the n pixels comprising the modulation group $G_i$ along each of its two axes x and y using m-bit words. FIG. 9B illustrates the mapping of the axis x and y coordinates of the n pixels comprising the PDA pixel modulation group $G_i$ into individual directions within the three dimensional light field defined by angular extent θ of the associated MLA 220 micro lens element such as that of the exemplary embodiment illustrated in FIG. 8A. As an illustrative example, when the dimensions of the individual pixels of the PDA device 210 are (2×2) microns and the PDA pixel group $G_i$ is comprised of $n=(2^3 \times 2^3)=(8 \times 8)$ pixel array and the angular extent of the associated MLA 220 micro lens element is $\theta=\pm15°$, then each of the PDA two dimensional pixel groups $G_i$ of size (16×16) micron at the PDA device 210 aperture surface would be able to detect $(8)^2=64$ individually addressable light directions (views) spanning the angular extent of $\theta=\pm15°$. When the PDA/MLA assembly 230 is articulated as described earlier (see FIG. 2 and FIG. 4A) using the 2-axis gimbals of the embodiments 600 and 700, the directional angular extent provided by the lens elements of the PDA/MLA assembly 230 will be temporally extended by the maximum articulation angle $\pm\alpha_{max}$ provided by the gimbal. Thus the directional angular extent provided by the spatio-temporal light field cameras of this invention would be temporally extend over an angular coverage totaling $\pm(\theta+\alpha_{max})$. For example when the angular extent of the MLA 220 lens element is $\theta=\pm15°$, and the maximum articulation angle $\alpha_{max}=\pm30°$, then the full angular extent that would provided by the spatio-temporal light field cameras of this invention would be $(\theta+\alpha_{max})=\pm45°$, and the light detection directions (views) it would able to temporally capture would be $n[(\theta+\alpha_{max})/\theta]^2=9\times$ the number of light directions (views) that can be detected by the PDA/MLA assembly 230 (see FIG. 5); namely, $9(8)^2=576$ light directions (views). Meaning that the number of views that can be captured by the spatio-temporal directional light field cameras of this invention would be (3×3)n, where n is the size, in terms of number of PDA device pixels, of the pixel groups $G_i$ associated with one of the MLA 220 lens elements. Thus, for this example the spatio-temporal directional light modulator of this invention would offer an expanded directional detection resolution of 9× the directional detection resolution provided by PDA/MLA assembly 230. In general, the directional resolution provided by the spatio-temporal light field cameras of this invention would be $n[(\theta+\alpha_{max})/\theta]^2$ with an angular extent that extends over an angle of $\pm(\theta+\alpha_{max})$.

In addition to the directional detection capabilities for the spatio-temporal light field cameras of this invention, spatial detection would also be possible using an array of (N×M) of the PDA device 210 pixel groups $G_i$ such as that described in the previous design example. If, for example, it is required to create a light field camera of this invention with spatial resolution of N=256 by M=256 that provides the $9(8)^2=576$ directional detection views of the previous example, the spatio-temporal light field cameras of this invention would comprise an array of (256×256) directional detection groups $G_i$ each comprising (8×8)=64 pixels and when a PDA device 210 with (2×2) micron pixel size is used, the PDA device 210 will be comprised of (2048×2048)=4.194 mega pixels, thus making the aperture size of the spatio-temporal light field cameras of this invention be approximately 4.1×4.1 millimeter. Using the angular extent values of the previous example, the spatio-temporal light field cameras of this invention can capture 576 views of the light field within an angular extent of ±45° with a spatial resolution of (256×256)=65,536 pixels. As explained earlier, it would also be possible to tradeoff the directional resolution of the spatio-temporal light field cameras of this invention for an increased spatial resolution. For example, in the previous example if the pixel group size is reduced to (4×4) pixels, the spatio-temporal light field camera of the previous example, using the same PDA device that is comprised of (2048×2048)=1.048 mega pixels, would provide $(512)^2=262,144$ spatial resolution and $(3\times4)^2=144$ directional resolution.

As illustrated by the previous examples, the spatial and directional detection resolutions of the spatio-temporal light field cameras of this invention in terms of the number of individually detectable directions within a given angular extent would be determined by selecting the resolution and pixel pitch of the PDA device 210, the pitch of the MLA 220 lens elements, the angular extent of the MLA 220 lens elements and the maximum articulation angle of the camera gimbal. It is obvious to a person skilled in the art that the MLA lens system can be designed to allow either wider or narrower angular extent, the gimbal design can be selected to allow either wider or narrower articulation angle and the number of pixels within each pixel group can be selected to be either smaller or larger in order to create spatio-temporal light field cameras that can achieve any desired spatial and directional detection capabilities following the teachings provided in the preceding discussion.

The principle of operation of the spatio-temporal light field cameras of this invention will be described in reference to the illustrations of FIGS. 9A and 9B. FIG. 9A illustrates the two dimensional addressability of each of the modulation group $G_i$ using m-bit resolution for the directional modulation. As explained earlier, light detected by the $(2^m \times 2^m)$ individual pixels comprising the pixel group $G_i$ is mapped by its associated MLA 220 elements into $2^{2m}$ light directions within the angular extent ±θ of the associated MLA micro lens element. Using the (x, y) dimensional coordinates of the individual pixels within each of the modulation groups $G_i$, the directional coordinates (θ,φ) of a detected light beam is given by:

$$\theta(t) = \alpha_x(t) + \arctan\left[\frac{\sqrt{x^2+y^2} \times \tan(\Theta)}{0.5 \times (n-1)}\right] \quad \text{Eq. 1}$$

$$\varphi(t) = \alpha_y(t) + \arctan\left[\frac{y}{x}\right] \quad \text{Eq. 2}$$

Where the $\alpha_x(t)$ and $\alpha_y(t)$ are values of the articulation angles around the x-axis and y-axis at the time epoch t; respectively, the angles θ(t) and φ(t) are the values of the directional spherical coordinates of the detected light beam at the time epoch t with the polar axis at θ=0 parallel to the z-axis of the detection surface of the modulation group $G_i$ and m=log 2 $\sqrt{n}$, is the number of bits used to express the x and y pixel resolution within the modulation group $G_i$. The spatial resolution of the spatio-temporal light field cameras of this invention is defined by the coordinates (X, Y) of each of the individual pixel group $G_i$ within the two dimensional array of modulation groups comprising the overall aperture of the spatio-temporal light field camera. In essence, the spatio-temporal light field cameras of this invention would be capable of temporally capturing a light field described by the spatial coordinates (X, Y) defined by its detection pixel group array and the directional coordinates (θ,φ), with the latter being defined by the values of the coordinates (x, y) of the pixels within the detection group $G_i$ and the temporal value of the articulation angle of the spatio-temporal light field cameras as defined by Eq. 1 and 2 above.

Another distinctive aspect of the spatio-temporal light field cameras of this invention is that unlike prior art light field cameras described earlier which typically capture a set of planar stationary parallaxes of the light field, the spatio-temporal light field cameras of this invention capture curved temporal parallaxes of the light field. FIG. 9C illustrates the curved temporal parallax that can be captured by the spatio-temporal light field of this invention. As illustrated in FIG. 9C, because of its temporal angular articulation, the parallaxes of the light field captured by the spatio-temporal light field cameras of this invention are actually curved both temporally and in each of the 2-dimensional spatio-directional (X, θ) or (Y, φ) parallaxes (slice) of the light field it captures. Because of this distinctive feature, the spatio-temporal light field cameras of this invention can capture a curved wavefront, which is a more natural way of recording light field information than prior art light field cameras as most optical devices, including the human visual system (HVS), have a naturally curved image plane. Furthermore, the captured information includes temporal samples of the light field, which means that the spatio-temporal light field cameras of this invention can record information not only about the spatial and directional aspects of the light field but also about the phase of the wavefront of the light field it captures. In essence, therefore, the spatio-temporal light field cameras of this invention can record curved parallaxes of the 4-dimensional spatio-directional space of the light field plus the phase of its wavefront. In other words, the spatio-temporal light field cameras of this invention can record all 5-dimensions of the light field; two spatial dimensions, two directional dimensions plus phase. Numerous light field photography and display capabilities will be enabled by this 5-dimensional light field feature of the spatio-temporal light field cameras of this invention, a few of which are discussed in subsequent paragraphs of this disclosure.

Any desired spatial and directional detection capabilities can be realized using the spatio-temporal light field cameras of this invention. The previous examples illustrated how spatio-temporal light field cameras of this invention with $(256)^2$ spatial resolution and $(3\times8)^2$ directional resolution can be implemented using a single 4.1×4.1 millimeter PDA device 210. One possible approach to realize the spatio-temporal light field of this invention with a higher spatial resolution can be achieved using a higher pixel resolution PDA device 210. If for example a PDA device 210 that comprises a (512×512) of the n=64 pixel groups is used, meaning a PDA device that is comprised of (4096×4096) =16.8 mega pixels, the spatio-temporal light field camera of the previous example of this invention can capture 576 views of the light field within an angular extent of ±45° with a spatial resolution of 262,144 pixels. In this case the full aperture of the spatio-temporal light field cameras of this invention would only be approximately 8.2×8.2 millimeter.

Another possible approach to realize even higher spatial resolution spatio-temporal light field cameras of this invention can be achieved by tiling a multiplicity of smaller spatial resolution PDA/MLA assemblies 230 of this invention. For example, when an array of (3×3) of the PDA/MLA assemblies 230 of the previous example are tiled as illustrated in FIG. 10, the resultant spatio-temporal light field cameras would provide $(3\times512)^2$ spatial resolution (more than 2.35 mega pixels) with $(3\times8)^2=576$ directional resolution. The full aperture size of the spatio-temporal light field cameras of this invention in this case would be approximately 2.46×2.46 centimeter, but its thickness would still be approximately 5 millimeter. The tiling of a multiplicity of the spatio-temporal light field cameras of this invention in order to realize a higher spatial resolution version is possible because of its compact volumetric dimensions. For example, the spatio-temporal light field camera of the previous example that uses a single PDA device 210, which by itself would have a width, height and thickness of 8.2×8.2×5 mm; respectively, can be used to create the larger resolution version illustrated in FIG. 10 which would have the dimension of 2.46×2.46×0.5 cm in width, height and thickness; respectively. It would be possible to implement the higher spatial resolution version of the spatio-temporal light field cameras of this invention illustrated in FIG. 10 by bonding a multiplicity of the PDA/MLA assemblies 230 of the previous example to a backplane using electrical contacts of the micro ball grid array (MBGA) located on its backside, which given the zero-edge feature of the embodiment 700 of this invention, would make it possible to realize seamless tiling of a multiplicity of such light field capture devices to implement any desired size of the spatio-temporal light field cameras of this invention. Of course the size of the array of PDA/MLA assemblies 230 illustrated in FIG. 10 can be increased to the extent needed to realize any desired spatial resolution. It is worth noting that the tiling of PDA/MLA assemblies 230 in the spatio-temporal light field cameras of this invention in order to realize the expanded spatial aperture illustrated in FIG. 10 is made possible by the zero-edge feature described earlier of the embodiment 700 of this invention.

Figure 11:
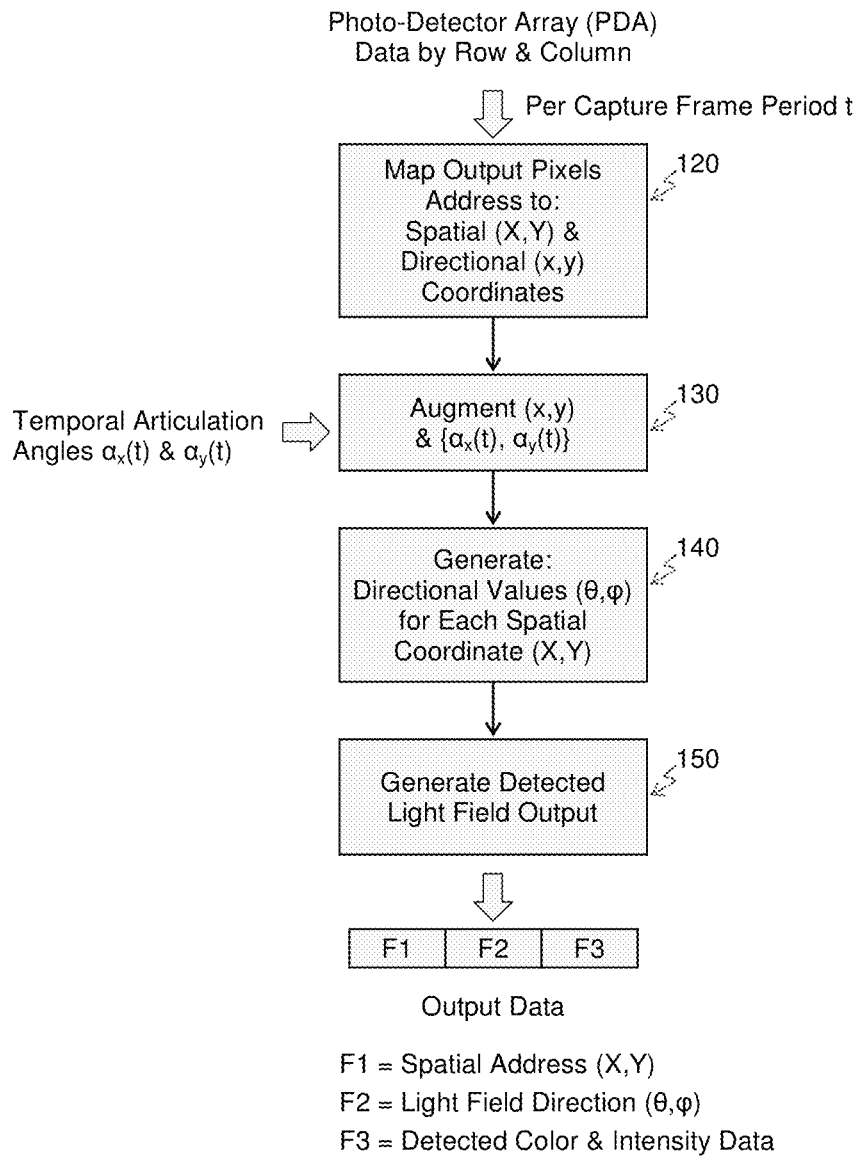
FIG. 11 illustrates a block diagram explaining the data processing block diagram of the spatio-temporal light field of this invention.

FIG. 11 illustrates an exemplary embodiment of the data processing block diagram of the spatio-temporal light field cameras of this invention. As illustrated in FIG. 11, the output data from the spatio-temporal light field cameras of this invention will be formatted in multiple bit words whereby each output word contains three data fields. The first data field is the address (X, Y) of spatial group $G_i$ within the detection pixel group array comprising the aperture of the spatio-temporal light field cameras of this invention. This first data field will in effect represent the spatial address of the output of the spatio-temporal light field cameras of this invention. The two remaining data fields provide the data representation of the light detected by the spatio-temporal light field cameras of this invention in each of the directional coordinates (θ,φ) for each of the spatial coordinates (X, Y). These two data fields will in effect represent the directional output of each of the spatial coordinates (X, Y) of the spatio-temporal light field cameras of this invention. Referring to FIG. 11, the data processing block 120 processes the output of the PDA device 210 and decodes the pixel output address data to derive the spatial addresses (X, Y) and the directional addresses (x, y). In the data processing block 130 of FIG. 11, the directional addresses (x, y) are then augmented with two additional data fields that represent the instantaneous values of the articulation angles $\alpha_x(t)$ and $\alpha_y(t)$. In the data processing block 140 of FIG. 11, the directional values (x, y) are combined with the instantaneous values of the articulation angles $\alpha_x(t)$ and $\alpha_y(t)$ using Eq. (1) and (2) to generate the directional coordinate values $(\theta,\phi)$. The data processing block 150 concatenates the detected light intensity and color data fields of data output values of the pixels of the PDA device 210 with the mapped spatial addresses (X, Y) and directional coordinates $(\theta,\phi)$ to generate the three data fields: F1=the spatial addresses (X, Y), F2=the directional coordinates $(\theta,\phi)$; and F3=the detected light intensity and color data.

In using a 16-bit word for representing the directional coordinates $(\theta,\phi)$ of the detected light field and the typical 24-bits for representing the modulated light intensity and color in each direction, the total number of bits that would represent the detected light field for each spatial address (X, Y) would be 40-bit words. In assuming, without loss of generality, such 40-bit words would be outputted from the spatio-temporal light field cameras of this invention sequentially; i.e., sequential addressing is used to output the 40-bit words, block 120 of FIG. 11 would be responsible for routing the sequentially outputted data word from the designated PDA device. Block 150 of FIG. 11 would be responsible for formatting and outputting the 40-bit words of the F2 and F3 data fields of the detected light field data sequentially for each of the spatial coordinates (X, Y). It should be noted that the entire data processing flow illustrated in FIG. 11 will be executed once per capture frame period. In using the previous example in which the spatial resolution of the spatio-temporal light field cameras of this invention is (256×256), and in assuming the frame capture period is 16.67 millisecond (which is equivalent to 60 Hz frame rate), the spatio-temporal light field cameras of this invention would output 256×256×40-2.62 megabit per the 16.67 millisecond frame cycle; which is equivalent to approximately 157 Mbps output data rate. With this exemplary data processing flow of the 40-bit word sequential data output, the spatio-temporal light field cameras of this invention would detect the light field that enters its aperture in intensity, color and direction and output the detected light field the information encoded within its output data.

Possible Applications

3D Camera—

The spatio-temporal light field cameras of this invention can be used to implement a 3D camera with arbitrary spatial and directional resolutions that is realized, for example, as a tiled array of a multiplicity of PDA/MLA assemblies 230 such as that illustrated in FIG. 10. Such a tiled array functionally is the same as a much larger PDA/MLA assembly. The expanded full angular extent that can be realized by the spatio-temporal light field cameras of this invention would enable the realization of 3D cameras that are volumetrically compact and capture a large field of view, yet without the use of bulky and costly optical assemblies as with the case of prior art light field cameras. The level of volumetric compactness that can be achieved by the spatio-temporal light field cameras of this invention will enable the realization of ultra compact 3D light field cameras that can be embedded in mobile devices such cell phones and tablet PC and the like. In addition the 3D light field captured by the spatio-temporal light field cameras of this invention as represented by the output format described in the preceding discussion, would be directly compatible with the class of light field modulators described in U.S. patent application Ser. No. 13/329,107 entitled "Spatio-Optical Directional Light Modulator" and Ser. No. 13/546,858 entitled "Spatio-Temporal Directional Light Modulator", both assigned to the Assignee of the present application, thus making it possible to capture the 3D light field using the spatio-optical light field cameras of this invention, then directly displaying it using the light field modulators described in the applications referenced above.

Computationally Focused 2D Camera—

Figure 12:
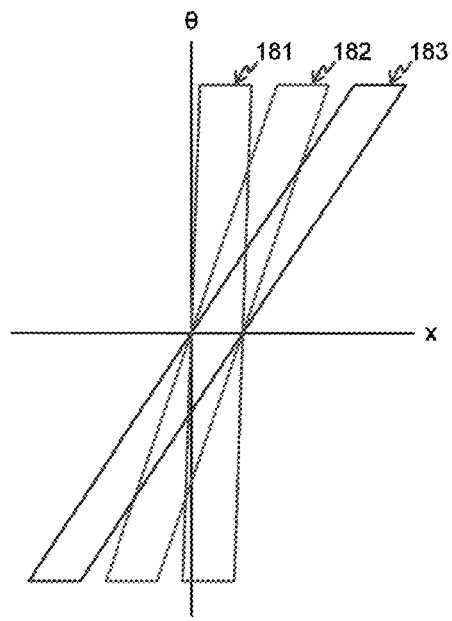
FIG. 12 illustrates the light field captured by the spatio-temporal light field camera of this invention in a two dimensional slice across its 4-dimension spatial and directional light field space.

The spatio-temporal light field cameras of this invention can also be used to capture 2D light field images, either still or video, that can be computationally (or digitally) focused. In this case the output of the spatio-temporal light field cameras of this invention described in FIG. 11 will be processed by an image processor to create an image that is focused on any plane or surface within the captured light field. FIG. 12 is an illustration of the light field that would typically be captured by the spatio-temporal light field cameras of this invention in a two dimensional slice $(X, \theta)$ across its spatial dimensions (X, Y) and its directional dimensions $(\theta,\phi)$. The trapezoids 181, 182 and 183 represent the light field captured in the parallax slice $(X, \theta)$ from three objects at different distances from the spatio-temporal light field cameras of this invention. The trapezoids 181 represents the light field from the object nearest to the light field camera and the trapezoids 183 represents the light field from the object farthest from the camera while trapezoids 182 represents the light field from an object at an in between distance. As can be seen from FIG. 12, the distance of the object from the spatio-temporal light field cameras of this invention, and hence the depth of the field, is encoded by the camera as the inclination of the light field captured by the camera in each parallax slice within the captured light field. Accordingly the depth information captured by the spatio-temporal light field cameras of this invention can be utilized to computationally create a 2D image that is focused on any desired object, plane, curved surface or even a 3D object within the captured light field. Such a computational (digital) focusing can be accomplished using established computational photography principles in which the sub-images of the light field captured by the individual lens elements of the MLA 220 are first computationally scaled by a factor that is proportional to the distance of the desired focus plane from the aperture of the camera, then the scaled sub-images are shifted in their (x, y) coordinates by a factor proportional to the pitch distance between the lens elements of the MLA 220, then added together to create an image that is focused at the desired plane or curved surface. It would also be possible to computationally create from the light field captured by the spatio-temporal light field cameras of this invention an image with any desired depth of focus. In this case a multiplicity of images focused on multiple planes or curved surfaces within the desired depth of focus are computationally created, as explained earlier, then summed to create a unified image which would then have in focus all of the imaged objects within the computationally created depth of focus (i.e. the depth volume defined by the depth of focus and the multiple planes of curved surfaces). It should be noted that it would also possible to computationally create from the light field captured by the spatio-temporal light field cameras of this invention an image that is focused on a curved surface. This capability is made possible because, as explained earlier (see FIG. 9C), the spatio-temporal light field cameras of this invention inherently capture curved parallaxes of the light field through the temporal angular articulation of their apertures, which creates a curved wide angle field of view. With this curved light field capture capability it would be possible to computationally create from the light field captured by the spatio-temporal light field cameras of this invention an image that is focused on multiplicity of objects at different distances from the camera yet with rather narrow depth of focus, which would consequently enables the capability of computationally creating higher resolution images of multiplicity of objects at different distances from the camera aperture.

Switchable 2D/3D Camera—

It is also possible for the spatio-temporal light field cameras of this invention to be switched from 2D to 3D display modes by adapting the format of its output data described earlier (see FIG. 11) to be commensurate with the desired operational mode. In either operational modes captured light field angular extent will be that associated with its MLA 220 micro lens element plus the articulation angle of its gimbal $\pm(\theta+\alpha_{max})$ with the pixel resolution of the individual modulation group $G_i$ and the maximum articulation angle $\alpha_{max}$ defining directional resolution of the camera, as described earlier, modulation groups $G_i$ defining its spatial resolution.

Networked Light Field Photography—

Figure 13:
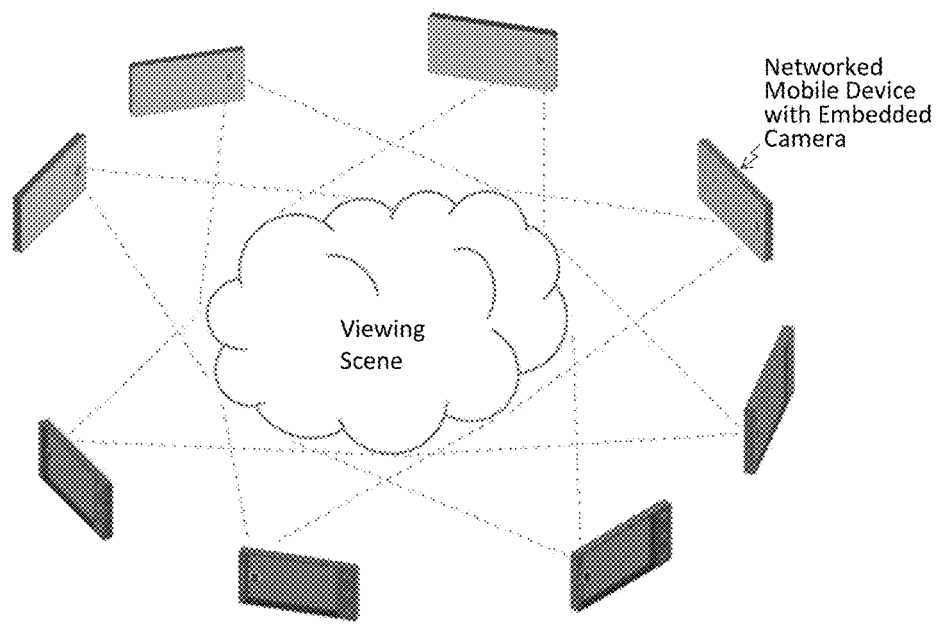
FIG. 13 illustrates the principal of networked light field photography enabled by the spatio-temporal light field camera of this invention

As stated earlier, the volumetric advantages of the spatio-temporal light field cameras of this invention make it possible to embed such a camera in mobile devices such cell phones and tablet PC. Since most all of such host mobile devices are typically interconnected either through wireless or wireline networks or through bulk data transfer using flash memory modules, it is possible to leverage such connectivity to further extend the light field captured by the light field cameras of this invention. In this embodiment, the output of a multiplicity of embedded spatio-temporal light field cameras of this invention located in the surroundings of a viewing scene that captured light field images of the viewing scene, as illustrated in FIG. 13, will have the data representing the light field it captured (described in FIG. 11). That data can be augmented with three additional data fields by application software incorporated into the operating system of the host mobile device. The first data field would specify the camera location, which would typically be the output of the location sensing device also embedded in the host mobile device, such as a global positioning system (GPS) receiver or triangulated wireless link; the second data field would specify the orientation of the mobile device, and thus the orientation of its embedded camera, which would typically be the output of an orientation sensing device also embedded in the mobile device, such as the micro gyros typically embedded in mobile devices for adapting the display screen orientation and for gaming; and the third data field would specify the time the light field of the viewing scene is captured by the camera, which would typically be the output of the internal mobile device clock which is typically kept synchronized with a network time. When this augmented light field data is exchanged with other mobile devices also having an embedded spatio-temporal light field camera of this invention that has captured the light field of the scene viewed from a different perspective, it would be possible to integrate the exchanged light field data captured by the multiplicity of such cameras and computationally fuse it together into a single super light field data set that represent the collective light field captured by all the embedded cameras that captured a partial perspective of the viewing scene. The computational aspects of this "networked light field photography" would involve making use of the location, orientation and time of capture data fields augmenting each exchanged or networked light field data to transfer such exchanged light field data from the coordinate of the set of respective embedded cameras that captured it to a set of viewing scene coordinates that would be used as the common coordinates of the networked light field. Once the light field data transformation (or fusion) is performed, the transformed collective light field data is exchanged back to all of the participating mobile devices for sharing the entire light field as captured collectively by all of the participating host mobile devices. The operational concept of the described networked light field photography embodiment is illustrated in FIG. 13.

Although reference is made in the preceding paragraph to a networked mobile device; such as cell phones and tablet PCs for example, being a host of the spatio-temporal light field cameras of this invention to enable the networked light field photography embodiment illustrated in FIG. 13, a person skilled in the art would know that it would be obvious to implement the networked light field photography embodiment of this invention by creating a networked light field camera device having its own integrated networking capabilities rather than having the light field camera being hosted or embedded into a networked mobile device since either approaches would be functionally equivalent.

The light field data exchange and the computational aspects of the networked light field photography described in the previous paragraph can be performed in one of multiple ways: (1) the superset of exchanged augmented light field data could be processed by each individual participating mobile device to generate the collective light field that aggregate the light fields of the viewing scene captured by all of the participating networked mobile devices; (2) the superset of exchanged augmented light field data could be partially processed by each individual participating mobile device in a processing load sharing style until the transformation of the exchanged data converges, possibly after multiple intermediate data exchanges through data networking, into the aggregate collective light field of the viewing scene captured by all of the participating networked mobile devices collectively; or (3) the superset of exchanged augmented light field data could be processed by a networked server that receives the augmented light field data sent through the network from all of the participating mobile devices with the embedded cameras that captured the viewing scene, then the server transforming the received data to generate the collective light field that aggregates the light field of the viewing scene captured by all of the participating networked mobile devices, with the server then downloading the transformed collective light field data back to the participating mobile devices. It should be noted that data compression, in particular compression schemes that takes advantage of the spatial, direction and temporal correlation inherently present within captured light field data, would be used throughout the exchange of networked light field photography process.

It is worth mentioning that the embodiment of the networked light field photography described in the preceding paragraphs would also be effective, albeit at somewhat lower light field capture resolution, even when the output of conventional digital cameras embedded in mobile devices is augmented with the location, orientation and time of capture, and is used to create a collective light field of a scene captured by a multiplicity of participating mobile devices networked and processed as described earlier. The use of the spatio-temporal light field cameras of this invention will further enhance the collective light field capture resolution that results from the networked light field photography described in the preceding paragraphs. It will also be possible to make use of combinations of augmented data from images captured by conventional digital cameras embedded in networked mobile devices together with the augmented light field data captured by spatio-temporal light field cameras of this invention embedded in networked mobile devices within the context of the networked light field photography described earlier. In this case both types of cameras would contribute images of the viewed scene captured from different perspective while the augmented data contributed by spatio-temporal light field cameras of this invention would in addition represent the entire light field in its field of view. In general, the networked light field photography embodiment described in the preceding paragraphs, using either the spatio-temporal light field cameras of this invention, conventional digital cameras embedded in mobile devices or a combination of both types of camera, would be effective in 3D capture of social events (such as sports games, concerts, etc. . . . ), and can also be effective in 3D surveillance and 3D cinema capture.

When the computational processing of the captured and augmented light field data is performed by a networked server as described in the preceding paragraphs, the networked light field photography can be applied within the context of an internet application that would allow its subscribers to participate by uploading to the server the light field data captured using their mobile device with an embedded spatio-temporal light field camera of this invention, then be able to download the collective light field computationally fused by the server from the light field data captured by all of the subscribers attending the same social event. In essence with the networked light field photography, the participants who each captures the scene from a different perspective (where they stand relative to the viewing scene) using their embedded spatio-temporal light field camera of this invention would collaborate through their server connectivity to collectively create a light field of the viewing scene that all participants can share by downloading the fused collective light field from the server.

In the alternative approach described earlier in which the computational processing of the augmented light field data is performed by each individual participants' mobile device or other personal computational assets like a PC for example, the fused collective light field data of the viewing scene can still be shared among the participants using either the same media through which their captured light field data was originally shared or through internet accessible sites such as a blog or a social network site. In essence with this alternative approach of the described networked light field photography embodiment the participants who each captures the viewing scene from a different perspective (where they stand relative to the viewing scene), using their embedded spatio-temporal light field camera of this invention, would exchange their captured and augmented light field data using either a mobile wireless telephone network, wireless local network (WLAN), such as WiFi for example, a personal area network (WPAN), such as Bluetooth for example, or through bulk data transfer using flash memory modules, then use their personal computing assets in order to fuse the shared light field data to create the collective light field data which they in turn can share with other participants through one of the media used to exchange the individually captured and augmented light field data. It should be mentioned that the latter approach of the networked light field photography can also be applied to create 2D wide angle views (or panoramas) of a viewing scene which would be captured collaboratively by multiple participants using their networked mobile devices with an embedded spatio-temporal light field camera of this invention.

The above camera embodiments, networked or not, record a four dimensional light field (X and Y positions and angles to the sources of the light) that when displayed using the light field data from that one camera or using the fused collective light field data of the viewing scene from the described networking, create a three dimensional image of the scene viewed by the camera. Such a three dimensional image may be viewed from any angle and still present a three dimensional image. By way of example, a horizontal image might be displayed at a table top or coffee table level. Such an image will be a three dimensional image within the field of view of the camera that took the image when viewed by persons standing anywhere around the display.

As an alternative, some three dimensional images might be viewed in a predetermined manner rather than from any angle around the image. By way of example, a three dimensional image might be displayed in a vertical plane, and viewed sitting down or standing up by persons looking straight at the image without significant tilt of their heads. In that application of images recorded by the camera, the three dimensional appearance of the images in the vertical direction is not perceived by the viewers, so that the recorded images need only have recorded the horizontal angles to the sources of the light over the field of view of the camera. The recording of the total light from any point in the viewing scene in the vertical direction is all that is essential for the three dimensional effect, as the angles to the sources of the light in the vertical direction are not perceivable when a viewers eyes are kept horizontal. Such an embodiment can simplify the camera.

As an example, if the photo detector array has a sufficient number of pixels to provide the desired resolution in the vertical direction, then the photo detector array need not be articulated about two axes, but instead articulated about one axis only, in this example, the vertical axis so as to only expand the horizontal field of view and/or the spatial resolution. Instead of using a 3×3 tiled array of PDA/MLA assemblies 230, one could use a 3×1 array, so that the articulation capability, articulation actuators, articulation sensors and interconnects for one axis are eliminated.

Of course in such applications, as a further alternative, the full three dimensional image may be recorded, and then before or on playback, the image data may be processed so that the three dimensional effect in the vertical direction is eliminated, in which case the light at any point in the image would be displayed without consideration of the angle in the vertical plane from which the light originated within the field of view of the camera.

In summary, the foregoing description presented multiple embodiments of novel light field cameras that overcome the limitations and weaknesses of prior art light field cameras and make it feasible to create light field cameras that can be used to record either still or motion video images, that can be embedded in mobile devices, and offer the users of such devices the capability of computational focusing of 2D images and the capture of 3D images both over a wide angular extent, and to provide the capability for networked light field photography. Of course, features and implementations of any embodiment may be incorporated in any other embodiment, and are not limited to use with respect to any single embodiment.

Thus the present invention has a number of aspects, which aspects may be practiced alone or in various combinations or sub-combinations, as desired. While certain preferred embodiments of the present invention have been disclosed and described herein for purposes of illustration and not for purposes of limitation, it will be understood by those skilled in the art that various changes in form and detail may be made therein without departing from the spirit and scope of the invention as defined by the full breadth of the following claims.

What is claimed is:

1. A method comprising:
    providing a plurality of light field cameras each having;
        a micro photo-detector array device having a light detection surface and
        a micro lens array of micro lens elements;
        whereby the micro photo-detector array device and the micro lens array are assembled together and temporally angularly articulated as a single assembly around two orthogonal axes parallel to a plane of the light detection surface of the micro photo-detector array device;
        the temporal angular articulation being within a range of plus to minus a maximum angular articulation for each axis;
        the periodicity of the temporal angular articulation being selected to enable temporal coverage of the maximum articulation angle within an image frame capture duration;
        wherein the temporal angular articulation is either temporally continuous or discrete and has a repetition rate that is proportional to and synchronized with an image capture frame rate whereby the maximum angular articulation around each of the two axes determines the full angular extent of the light field camera, the angular coverage shape it subtends, and its aspect ratio;
    embedding each light field camera in a respective mobile device;
    interconnecting each mobile device to at least one host device through wireless or wireline networks or through bulk data transfer using flash memory modules;
    exchanging light field camera output data between mobile devices that captured a different perspective of a viewing scene and the host device to form collective light field camera output data; and
    using the collective light field camera output data to create a collective light field of the viewed scene.

2. The method of claim 1 wherein each light field camera is provided with a tiled array of the micro photo-detector array devices and micro lens arrays.

3. The method of claim 1 wherein the mobile devices are cell phones, tablet PCs or light field cameras with their own connectivity capabilities.

4. The method of claim 1 wherein forming the collective light field camera output data is performed by either of the following ways:
    (1) processing the collective light field camera output data by each mobile device to generate the collective light field wherein each mobile device acts as a host device;
    (2) wherein the host device is a network server, and processing the collective light field camera output data by the network server, then downloading the collective light field of the viewed scene to the mobile devices.

5. The method of claim 1, wherein each micro lens element of the micro lens array being associated and aligned relative to a respective group of pixels, with each micro lens element optically mapping light that impinges an aperture of the respective micro lens element from each of a discrete set of directions within a light field, as defined by an angular extent of the respective micro lens element, onto a respective pixel in the respective group of pixels, the discrete set of directions defining an angular resolution between adjacent directions and an angular extent of the discrete set of directions.

6. The method of claim 1,
    wherein the temporal angular articulation temporally expands the angular extent of the respective micro lens element onto a corresponding group of pixels about each axis by a maximum angular articulation, thereby temporally expanding a detectable light field size and increasing the number of directions to an expanded discrete set of directions about each axis by a ratio of the angular extent expansion to the angular extent along the respective articulation axis, the light field camera having a spatial resolution that is determined by the number of groups of pixels along the respective axis and having a directional resolution that is determined by the number of individual directions within the temporally expanded discrete set of directions; and
    wherein the offset of the optical centers of the micro lens elements enable an increase of directional resolution without sacrificing either the spatial resolution or the full angular extent of the light field camera.

7. The method of claim 1, wherein the angular articulation around each of the two orthogonal axes is at least equal to the image capture frame rate multiplied by a factor that equals a ratio of a size in degrees of the full angular extent along each respective axis to a size in degrees of the angular extent.

8. The method of claim 1, wherein each of the light field camera has an angular resolution defined as an angular separation between individual directions within the temporally expanded discrete set of directions and determined by a fractional value of the angular extent being addressed by each pixel within a pixel group.

9. The method of claim 1, wherein each micro lens element optically maps light that impinges an aperture of the respective micro lens element from a discrete set of directions within a light field defined by an angular extent of the respective micro lens element onto the corresponding pixels within the respective group of pixels.

10. The method of claim 9, wherein the micro lens elements are truncated to each have respective dimensional aspects match that of the respective two dimensional group of pixels, and each have their respective optical center aligned with a center of their respective two dimensional group of pixels.

11. The method of claim 9, wherein the angular articulation temporally expands the angular extent of the respective micro lens element onto the corresponding group of pixels about each axis by a maximum angular articulation, thereby temporally expanding a detectable light field size and increasing the number of directions in the discrete set of directions about each axis by a ratio of said angular extent expansion to the angular extent along the axis of the temporal angular articulation.

12. The method of claim 11, wherein each pixel within each group of pixels, being individually addressable, together with the association of each pixel within each group of pixels with the temporally expanded discrete set of directions allowing the addressability of the pixels over the temporally expanded discrete set of directions, enables the light field camera to detect the light that impinges an aperture of the light field camera from the expanded light field size defined by the discrete set of directions comprising the set of the temporally expanded discrete set of directions.

13. The method of claim 12, wherein each micro photo-detector array device detects individual pixel color and intensity, thereby enabling the light field camera to detect color, intensity and direction of light that impinges the aperture of the light field camera from the expanded light field size defined by a discrete set of directions comprising the temporally expanded discrete set of directions.

14. The method of claim 11, wherein the temporal angular articulation causes any individual directions within the expanded discrete set of directions to be detected during a time interval during which the respective light direction falls within the temporally articulated angular extent.

15. The method of claim 11, wherein each pixel of each of the groups of pixels is individually addressable to detect color, intensity and direction of the light that impinges an aperture of the light field camera, thereby enabling the light field camera to spatially detect the intensity, color and direction of the light that impinges the aperture of the light field camera within the expanded light field size.

16. The method of claim 15, wherein the temporal angular articulation is about two orthogonal axes, and expands the angular extent of the respective micro lens element onto a corresponding group of pixels about each axis by a maximum angular articulation, thereby temporally expanding a detectable light field size and increasing the number of directions to an expanded discrete set of directions about each axis by a ratio of the angular extent expansion to the angular extent along the respective articulation axis, the light field camera having a spatial resolution that is determined by the number of groups of pixels along the respective axis and having a directional resolution that is determined by the number of individual directions within the temporally expanded discrete set of directions.

* * * * *